United States Patent [19]

Uemura et al.

[11] Patent Number: 4,521,020
[45] Date of Patent: Jun. 4, 1985

[54] APPARATUS FOR DISPLAYING GROUPED CHARACTERS IN SCANNING TYPE DISPLAY

[75] Inventors: Masayuki Uemura, Kyoto; Akitsugu Murauchi, Osaka; Takehiro Izushi, Kyoto, all of Japan

[73] Assignee: Nintendo Co., Ltd., Kyoto, Japan

[21] Appl. No.: 448,412

[22] Filed: Dec. 9, 1982

Related U.S. Application Data

[63] Continuation-in-part of Ser. No. 84,136, Oct. 12, 1979, abandoned.

[30] Foreign Application Priority Data

Dec. 5, 1978 [JP] Japan ................. 53-150782
Dec. 16, 1978 [JP] Japan ................. 53-155538
Apr. 24, 1979 [JP] Japan ................. 54-51114

[51] Int. Cl.³ ............................................. A63F 9/22
[52] U.S. Cl. ........................... 273/85 G; 273/DIG. 28; 273/1 E; 340/720
[58] Field of Search ............ 273/DIG. 28, 85 G, 1 E, 273/16 C, 313–315; 340/720

[56] References Cited

U.S. PATENT DOCUMENTS

| | | | |
|---|---|---|---|
| 4,015,846 | 4/1977 | Runte et al. ................. | 273/DIG. 28 |
| 4,026,555 | 5/1977 | Kirschner et al. ............. | 273/85 G |
| 4,116,444 | 9/1978 | Mayer et al. ................. | 273/DIG. 28 |
| 4,155,095 | 5/1979 | Kirschner .................... | 340/725 |
| 4,169,262 | 9/1979 | Schwartz et al. ............. | 273/DIG. 28 |

OTHER PUBLICATIONS

Daniel R. McGlynn, "*Microprocessors Technology, Architecture, and Applications,*" 1976, p. 77.

Primary Examiner—Richard C. Pinkham
Assistant Examiner—Lee P. Picard
Attorney, Agent, or Firm—W. G. Fasse; D. H. Kane, Jr.

[57] ABSTRACT

A cathode ray tube is coupled to an electric circuit to display characters on the screen thereof through horizontal scanning and vertical scanning. A plurality of characters are displayed in one character group comprising characters arranged in rows and columns. A display signal for displaying such characters is obtained from a random-access memory, which comprises a plurality of storing regions having addresses corresponding to the characters arranged in rows and columns forming a character group. When characters are to be displayed the logic one is loaded in the storing regions of the corresponding address, and when the characters are not to be displayed the logic zero is loaded in the storing regions in the corresponding address. The horizontal address of the random-access memory is determined by a counting operation for performing horizontal scanning, while the vertical address of the random-access memory is determined by a counting operation for performing vertical scanning. The horizontal address signal is obtained for a period corresponding to the scanning of the horizontal width of the character being displayed, while the vertical address signal is obtained for a period corresponding to the vertical width of the character being displayed. As a result, the same address information is obtained for that period from one storing region of the random-access memory, which is applied to a display as a display information signal.

66 Claims, 30 Drawing Figures

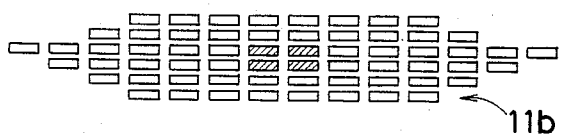
FIG.11A
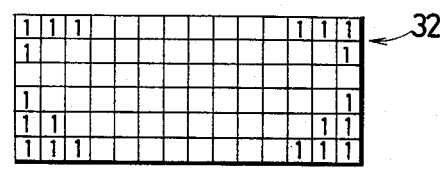
FIG.11B
FIG. 12
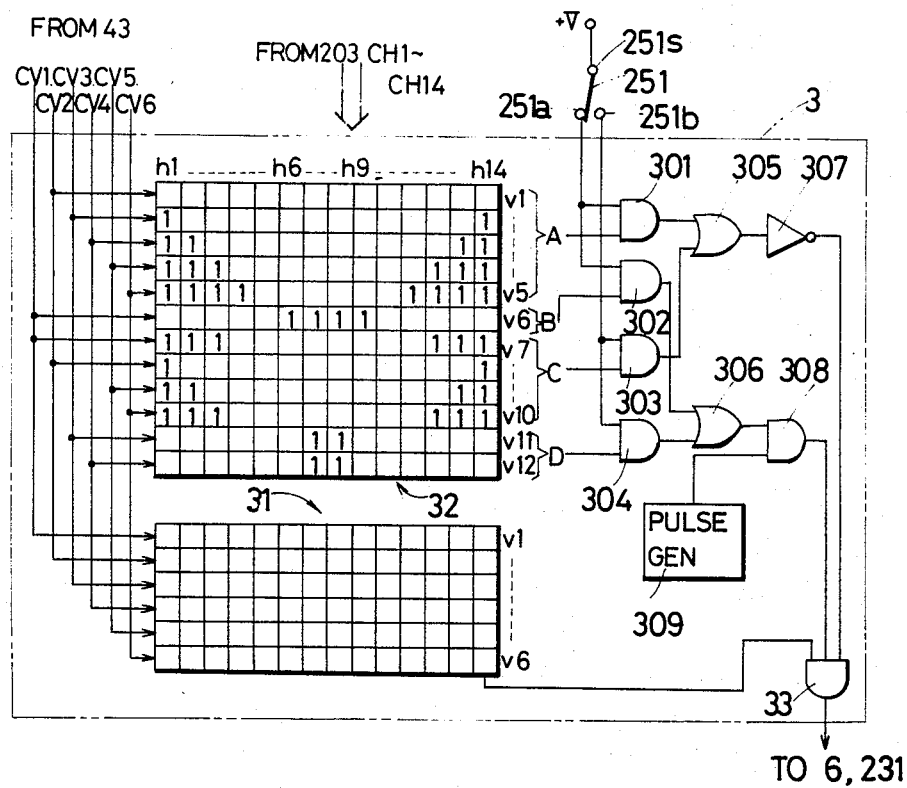

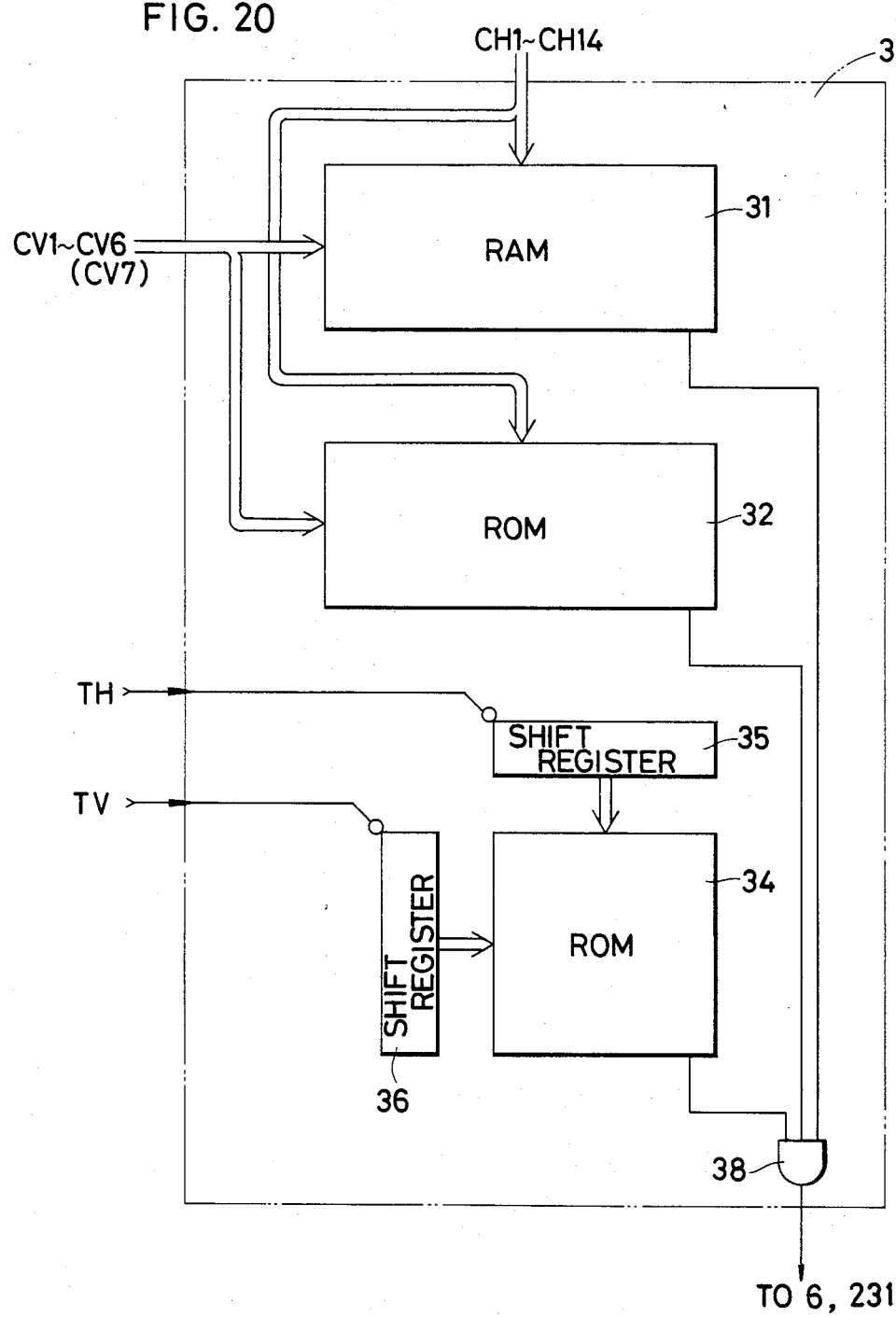

APPARATUS FOR DISPLAYING GROUPED CHARACTERS IN SCANNING TYPE DISPLAY

This is a continuation-in-part of application Ser. No. 084,136, filed Oct. 12, 1979, now abandoned.

CLAIM TO PRIORITY

The present application corresponds to Japanese patent application Nos. 150782/1978, filed in Japan on Dec. 5, 1978; 155538/1978, filed in Japan on Dec. 16, 1978; and 51114/1979, filed in Japan on April 24, 1979.

BACKGROUND OF THE INVENTION

The present invention relates to an apparatus for displaying grouped characters in a scanning type display. More specifically, the present invention relates to an apparatus for displaying characters for a television game by the use of a scanning type display such as a cathode ray tube.

With a recent development of microelectronics and a microcomputer, a television game machine capable of providing various types of games by the use of a television receiver has become popular.

In playing a game with such a television game machine, a plurality of characters are first displayed in an initial condition and a moving symbol such as a ball is displayed to move on the screen, while a position controllable symbol such as a racket is displayed on the screen such that a player hits and repulses the moving symbol with the position controllable symbol through manual operation of a control knob for the position controllable symbol in order to make the moving symbol collide with one of the characters. When the moving symbol collides with any one of the characters, the display of said one character is extinguished. The number of the characters as thus extinguished is counted to keep the score. The score is also displayed and a game is played by the score.

In order to display characters on the screen of a cathode ray tube of such a television game machine, a so-called video random-access memory may be used. It has been a conventional common practice that a video random-access memory comprises a plurality of storing regions corresponding to the picture elements of a picture frame of a cathode ray tube. As is well known, when a display is made using a cathode ray tube, a picture frame is scanned in the horizontal direction and in the vertical direction with an electron beam. According to the Japanese televison standard, one picture frame comprises 262 lines and the horizontal scanning is performed by way of interlace scanning. Let it be assumed that the horizontal line is divided into say 114 to consider one picture frame as comprising a plurality of picture elements arranged in rows and columns. Therefore, it was required that a conventional video random-access memory comprises a number of bits commensurate with the number of the product ($114 \times 262 = 29868$) obtained by multiplication of the number of divisions in the horizontal direction (114) by the number of divisions in the vertical direction (262) as the storage capacity of the memory. The stored information is read out bit by bit during the horizontal scanning and the vertical scanning and each time the logic one representing that display is to be made at the position corresponding to a given bit, is read, a display is made in the corresponding region on the screen of a cathode ray tube. Thus, the logic one is written in a plurality of bits or storing regions in a random-access memory corresponding to a respective plurality of picture elements constituting a configuration of a character to be displayed. As a result, it was required that a conventional video random-access memory comprises a considerably large storage capacity. Hence, such a video random-access memory was expensive and accordingly a game machine utilizing such a conventional random-access memory was also rather expensive.

In playing such a display game, an arrangement of characters being displayed need be returned to the initial condition to be ready for the following play or game, after one play or game is ended, so that the characters as extinguished in the previous play or game may again be displayed. To that end, a conventional game machine comprises a read-only memory for fixedly storing a predetermined pattern of characters to be attained in the initial condition. The read-only memory also comprises a plurality of bits corresponding to a respective plurality of picture elements constituting a configuration of a character being displayed, which necessitates an increased number of bits and thus also a large storage capacity. Accordingly, a read-only memory for such an arrangement pattern of characters also became expensive. Therefore, if it is desired that a configuration of a character is changeable, a read-only memory of a larger storage capacity was required.

In some type of conventional television game machines, a microcomputer has been utilized and the generation of signals for displaying a moving symbol such as a ball, a position controllable symbol such as a racket, and the like, detection of collision of the moving symbol with one of the characters, and the like have been achieved by respectively programming a microcomputer. However, a conventional video random-access memory and a read-only memory of a larger storage capacity as described above have increased the number of steps of control operations performed by a microcomputer and thus required a microcomputer of a higher speed and of a larger scale or capacity. Accordingly, a conventional game machine using a microcomputer became much more expensive.

In some cases, it is desired that the configuration of a character per se is changeable depending on the kinds of games or in order to increase an interest in a game, thereby to provide a much more interesting game machine. However, in order to change a configuration of a character per se being displayed using a conventional video random-access memory, it was necessary to load information associated with the character configuration as a plurality of bits into the video random-access memory corresponding to the changed character configuration. Typically, such a change of a character configuration is performed by way of programming or software processing by a microcomputer. Accordingly, a game machine capable of changing a character configuration became much more complicated and expensive. Thus, a conventional apparatus for providing display information to display grouped characters in a scanning type display became complicated and expensive as compared with an apparatus employing the present invention.

SUMMARY OF THE INVENTION

Briefly, according to the present invention, a plurality of characters 11 are displayed on a display in a given arrangement, and storage means RAM 31 for storing information is provided which comprises a plurality of storing regions corresponding to the number of characters being displayed in accordance with a display arrangement. According to the present invention, each storing region corresponds to each character and a signal of one logical state is loaded in those storing regions corresponding to the characters which are to be displayed, while a signal of the other logical state is loaded in those storing regions corresponding to the characters which are to be extinguished or not to be displayed. The storage means is addressed in terms of the row direction or the horizontal direction and in terms of the column direction or the vertical direction during the horizontal scanning operation and during the vertical scanning operation for display, so that each storing region is specified with respect to each corresponding character. In a scanning operation, an addressing signal is obtainable as the same address during a time period corresponding to a configuration of each single character being displayed, while a plurality of characters each having a given configuration or geometry are displayed on the screen as a group.

In a preferred embodiment of the present invention, the horizontal addressing of the above described storage means is performed by a counting operation of pulses corresponding in number to the width of a character being displayed. Similarly, the vertical addressing of the storage means is performed by a counting operation of pulses corresponding in number to the vertical width of a character being displayed. As a result, the storage means may comprise only the storing regions corresponding in number to the number of characters being displayed and need not comprise the storing regions corresponding to all the picture elements on the screen of a display, as required in a conventional apparatus. Accordingly, an apparatus for generating a video signal may be of an extremely simple structure and thus may also be inexpensive. Thus, by employing such a video signal generating apparatus in combination with a television receiver, a low cost televison game machine can be provided.

In another preferred embodiment of the present invention, an arrangement pattern of a plurality of characters being displayed is stored in separate storage means such as a read-only memory. The read-only memory for storing such an arrangement pattern comprises storing regions commensurate in number to the product obtained by multiplying the maximum number in the horizontal direction by the maximum number in the vertical direction of a plurality of characters in the arrangement pattern wherein a signal representing whether or not a character is to be displayed is stored in each storing region. The read-only memory for storing the arrangement pattern of the characters is also addressed in association with the horizontal scanning and vertical scanning. If a plurality of such read-only memories, each of which stores an arrangement pattern of characters, is provided to store a plurality of kinds of arrangement patterns, any one arrangement pattern can be selected. Accordingly, if such read-only memories are employed in a television game machine, the interest to players can be increased by providing a variety of games.

According to a further embodiment of the present invention, a second read-only memory for storing a configuration of each character per se to be displayed is provided. The second read-only memory comprises storing regions for one character to be displayed, wherein the horizontal width and vertical width are each divided into a plural number of respective width sections, so that each storing region may be loaded with a signal representing a desired configuration of one character to be displayed. The second read-only memory is read in the horizontal direction and in the vertical direction during the time period for specifying one storing region in the above described storage means to display one character, whereby a character having a configuration specified by the second read-only memory for storing a character configuration is displayed as each character of a plurality of characters arranged in a predetermined arrangement pattern on the screen of a display. According to the above described preferred embodiment of the present invention, no particular complicated software processing is required in order to change a configuration of each character and therefore a microcomputer of a simpler structure can be employed. Therefore, if such an apparatus for generating a character display information signal is employed in a television game machine, a game machine useful for playing a variety of different games can be provided at relatively little expense and with a simple structure.

OBJECTS OF THE INVENTION

Therefore, a principal object of the present invention is to provide an improved apparatus for displaying a group of characters in or on a scanning type display.

Another object of the present invention is to provide an apparatus for displaying a group of characters in a scanning type display, wherein the storage capacity of storage means for storing a display information signal can be considerably reduced.

A further object of the present invention is to provide an apparatus for displaying a group of characters in a scanning type display, wherein storage means for specifying a pattern of arrangement of characters being displayed can be dispensed with or can be structured with an extremely reduced capacity.

Still a further object of the present invention is to provide an apparatus for displaying a group of characters in a scanning type display, wherein a plurality of kinds of arrangement patterns of characters can be selected.

Still another object of the present invention is to provide an apparatus for displaying a group of characters in a scanning type display, wherein the configuration of each character being displayed can be changed.

It is a further object of the present invention to provide an improved television game machine.

It is still a further object of the present invention to provide a television game machine for domestic use of a simple structure and an inexpensive cost.

These objects and other objects, features, aspects and advantages of the present invention will become more apparent from the following detailed description when taken in conjunction with the accompanying drawings.

BRIEF FIGURE DESCRIPTION

In order that the invention may be clearly understood, it will now be described, by way of example, with reference to the accompanying drawings, wherein:

FIG. 11A is a view showing another example of a character arrangement pattern;

FIG. 11B is a view diagrammatically showing the information stored in the read-only memory for the pattern shown in FIG. 11A;

FIG. 12 is a block diagram of another embodiment of the character signal generating circuit, wherein a group of characters can be displayed in a plurality of different character arrangement patterns;

Figure 19:
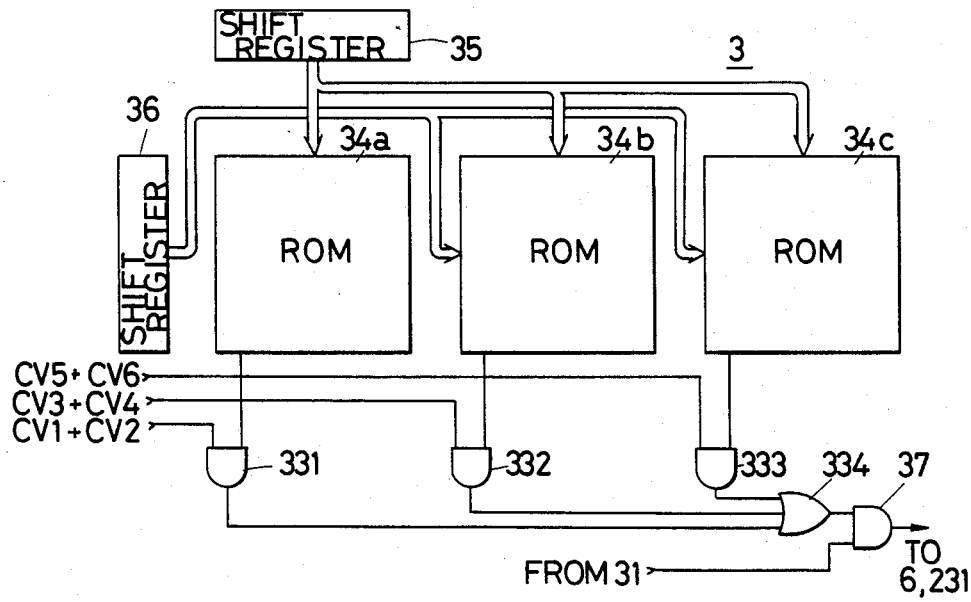

FIGS. 18A to 18E each show another example of character configurations or patterns;

FIG. 19 is a block diagram of an embodiment wherein three kinds of character configurations can be selected; and FIG. 20 is a block diagram showing still a further embodiment of the character signal generating circuit, wherein a group of characters each of a desired configuration, in a desired arrangement pattern, can be displayed.

DETAILED DESCRIPTION OF PREFERRED EXAMPLE EMBODIMENTS AND OF THE BEST MODE OF THE INVENTION

Figure 1:
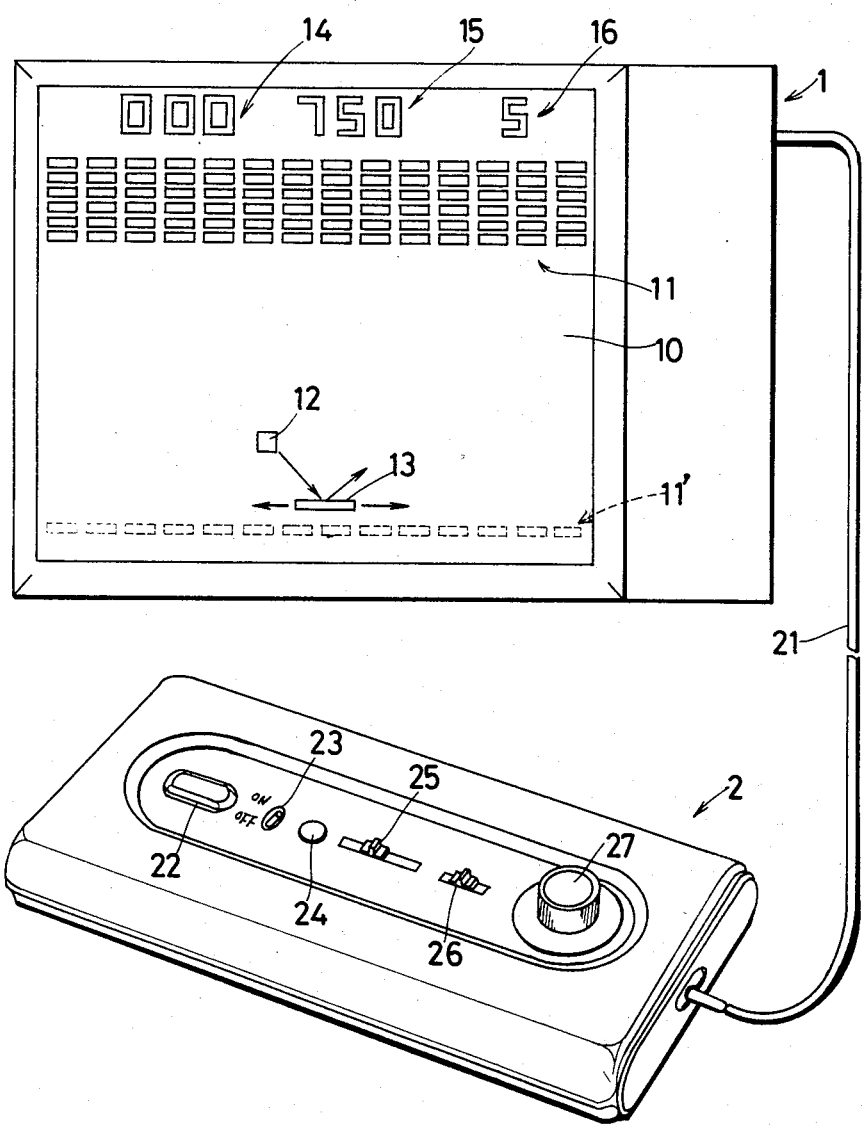
FIG. 1 is a view showing an outline of a television game machine of one embodiment of the present invention.

First referring to FIG. 1, one example of a television game machine embodying the present invention will be described. A high frequency input, such as an antenna terminal, of a television receiver 1 is connected to receive a high frequency signal obtained through a connection cord 21 from a game machine main body 2. The television game of the embodiment shown is referred to as "block game". A video signal obtained from the game machine main body 2 is displayed as various symbols and numerals on a screen 10 of the television receiver 1. FIG. 1 shows a display in the initial condition of such a game. In such initial condition, a group of characters such as block symbols 11 arranged in six rows and fourteen columns arranged from the left end to the right end is displayed on the screen 10. A position controllable symbol such as a racket symbol 13 is displayed beneath the block symbol group 11 in the vicinity of the bottom of the screen 10. A moving symbol such as a ball symbol 12 is displayed so as to be movable throughout the screen 11. The upper end portion of the screen 11 above the block symbol group 11 is used as a first score display portion 14 for displaying the score of a game now in progress, a second score display portion 15 for displaying the score of the previous game, and a ball number display portion 16 for displaying the number of balls which can be used in one play.

On the other hand, the game machine main body 2 comprises a serve switch 22 for causing the ball 12 that has disappeared from the screen 10 to again appear on the screen within the allowed number of balls. The main body 2 further comprises a power switch 23, a reset switch 24 to be depressed upon completion of one game for returning the display of various symbols and the like on the screen 10 to an initial condition, a game selection switch 25 for selecting the kinds of games that can be played with the game machine main body 2 shown, and a ball number selection switch 26 for selectively setting the number of ball symbols that can be used by a player in one game. The game machine main body 2 further comprises a racket operation switch knob 27 for controlling the position of the racket symbol 13 in the horizontal direction on the television screen 10. In playing a television game with such television game machine, first of all the power switch 23 is turned on, whereby the whole circuit of the game machine main body 2 is placed in an enabled state, whereupon the reset switch 24 is depressed, so that various displays on the television screen 10 are brought to an initial condition. Such a state is shown in FIG. 1. More specifically, in the initial condition, the block symbol group 11 is shown as a group of 84 block symbols. At the same time, the first score display portion 14 is reset to zero and the second score display portion 15 is enabled to display the score of the player who played the game immediately before the reset switch 24 is depressed, i.e., the score of the previous game. The ball number display portion 16 is enabled to display the number of balls that can be used by one player as set by the ball number selection switch 26, say, "5". Thereafter, the serve switch 22 is depressed. Then, the ball symbol 12 appears on the screen 10. The ball symbol 12 is caused to move freely throughout the television screen 10 under the control of a corresponding circuit portion included in the game machine main body 2. The movement of the ball symbol 12 is controlled such that if and when the ball symbol 12 collides with the racket symbol 13 or the block symbol 11 or a wall symbol, not shown, fixedly set around the television screen 10, the ball symbol 12 is repulsed as if the same is reflected so that the moving direction (and the speed) is changed. In this type of television game, the movement of the ball symbol 12 is controlled such that if and when the ball symbol 12 goes over the bottom end of the television screen 10 the same disappears from the screen 10 without being repulsed. The player can manipulate the operation knob 27 so that the racket symbol 13 is displaced in the horizontal direction on the screen, thereby to hit the ball symbol to be repulsed, thereby to prevent the same from disappearing. If and when the ball symbol 12 as repulsed by the racket symbol 13 or the wall symbol, not shown, collides with one of the block symbols in the block symbol group 11, the respective block symbol is extinguished from the screen 10. A different score is afforded in advance to each block symbol with a predetermined different score value. Each time a block symbol is extinguished, the score associated with the extinguished block is added, thereby to keep the total score, which is displayed on the score display portion 14. Accordingly, a player must control the operation knob 27 to quickly displace the racket symbol 13, thereby to prevent the ball symbol 12 from disappearing from the screen 10 and to make the ball symbol 12 collide with any one of the block symbols 11. The game is played by ascertaining the total score. This is an example of a block game.

The present invention is also directed to an apparatus for generating a display signal of a group of characters, such as block symbols, which can be advantageously utilized in such a television game machine. More specifically, the present invention is directed to an apparatus for displaying various symbols, particularly the grouped block symbols 11, 11' as shown in FIG. 1.

Figure 2:
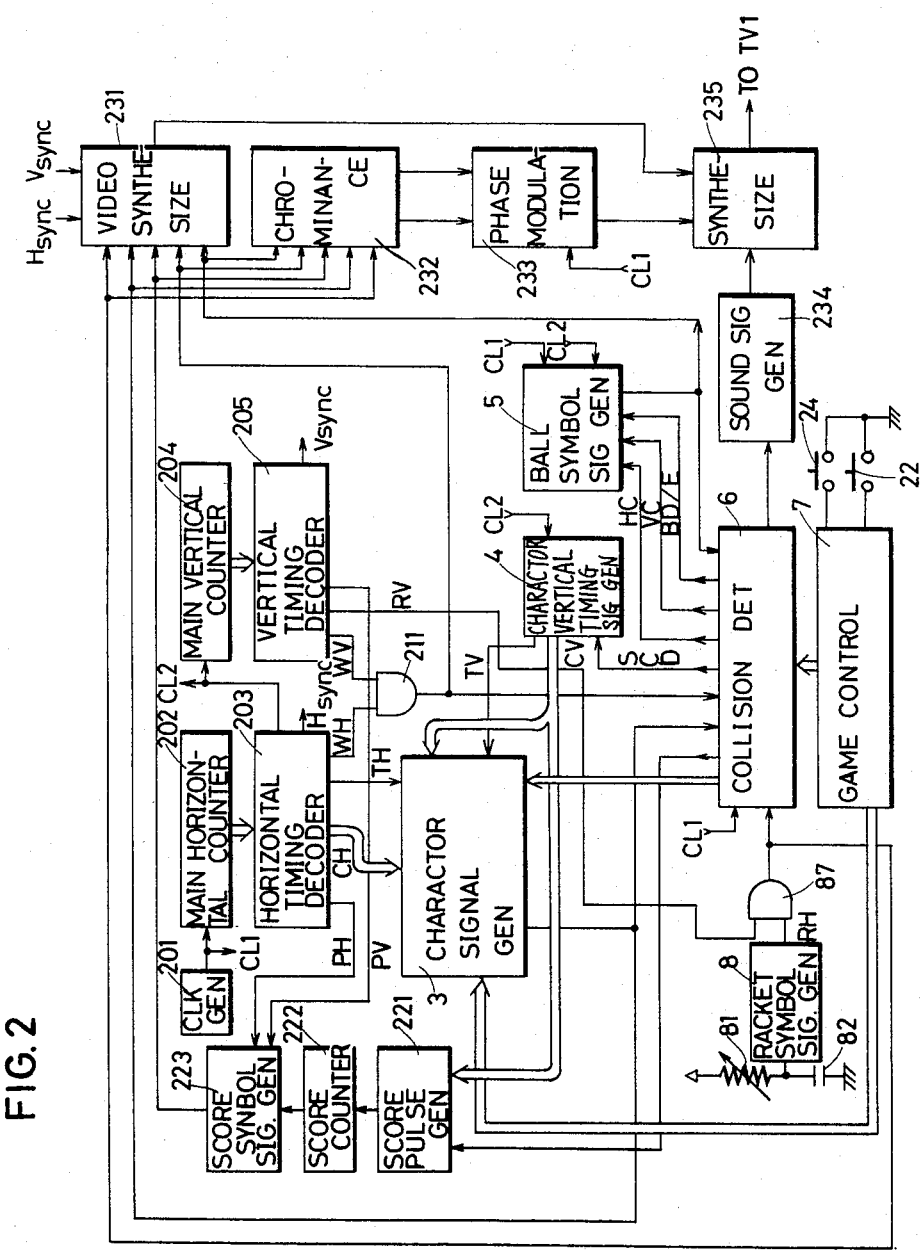
FIG. 2 is a block diagram of the television game machine shown in FIG. 1.

FIG. 2 is a block diagram showing the circuitry included in the game machine main body 2 shown in FIG. 1. The main body 2 comprises a clock generator 201, which may comprise a crystal oscillator, adapted to provide a reference clock signal CL1 having a frequency commensurate with the horizontal scanning frequency of a television receiver. The reference clock signal CL1 from the clock generator 201 is applied to a main horizontal counter 202. The horizontal counter 202 comprises 114-nary counter connected to receive the reference clock signal CL1. The count value in the main horizontal counter 202 is applied in a bit parallel fashion to a horizontal timing decoder 203. The horizontal timing decoder 203 may comprise a read-only memory for decoding the count value in the main horizontal counter 202 to provide the decoded output. The output of the horizontal timing decoder 203 is applied to a memory, not shown in FIG. 2 and described below, included in a character signal generating circuit 3 as addressing signals CH1 to CH14 representing the addresses in the horizontal direction or in terms of the columns of the memory. The horizontal timing decoder 203 also provides a horizontal timing signal TH for each horizontal timing to the character signal generating circuit 3. The horizontal timing decoder 203 decodes the count value in the main horizontal counter 202 to provide a horizontal synchronizing signal HSYNC of a television receiver and to provide one pulse for each horizontal scanning line, i.e. one circulation of the main horizontal counter 202. The above described pulse is applied to a main vertical counter 204 as a reference clock signal CL2 for use in a vertical synchronization associated circuit. The main vertical counter 204 is a 262-nary counter, for example. The count value in the main vertical counter 204 is applied in a bit parallel fashion to a vertical timing decoder 205. The vertical timing decoder 205 may comprise a read-only memory and decodes the count value in the main vertical counter 204 to provide a vertical synchronizing signal VSYNC of a television receiver. At the same time, both the horizontal timing decoder 203 and the vertical timing decoder 205 provide a score displaying horizontal position signal PH and a score displaying vertical position signal PV, respectively, for use in the score display portions 14 and 15 (and the ball number display portion 16) shown in FIG. 1, for example. At the same time, the decoders 203 and 205 provide the horizontal and vertical position signals WH and WV for the wall symbol, not shown in FIG. 1. The score display horizontal and vertical position signals PH and PV are both applied to a score symbol signal generating circuit 223. The hozizontal and vertical wall signals WH and WV are both applied to two inputs of an AND gate 211. The output from the AND gate 211 is applied to a collision detecting circuit 6 to be described below as a wall symbol signal and is also applied to a video synthesizing circuit 231.

Figure 3:
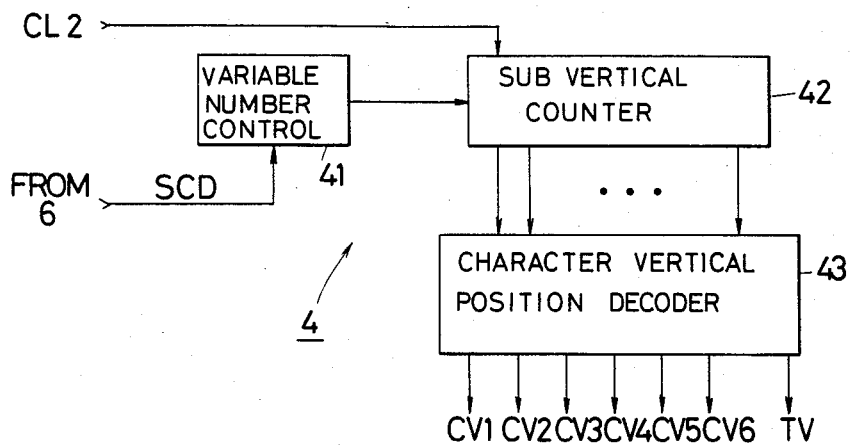
FIG. 3 is a block diagram showing in more detail a character vertical timing generating circuit.

In the embodiment shown, the vertical addressing signal for the character signal generating circuit 3 is obtained from a character vertical timing signal generating circuit 4 shown in more detail in FIG. 3. Referring to FIG. 3, the character vertical timing signal generating circuit 4 will be described in detail. The vertical addresses of the memory, to be described below, of the character signal generating circuit 3 are responsive to the output of the separately provided timing signal generating circuit 4, because it is intended to displace the character symbol group 11 shown in FIG. 1 as a whole in the vertical direction on the screen in the embodiment shown. As to be described in more detail below, according to an example of a game, when the ball symbol 12 is collided with a specified block symbol in the block symbol group 11, the display is controlled such that the block symbol group 11 as a whole is moved in the vertical direction such as downward as if the block symbol group 11 falls. If it is not necessary to displace the character symbol group 11 in the vertical direction such as downward, then the vertical timing decoder 205 may be constructed in the same manner as the horizontal timing decoder 203, so that the vertical addressing signal may be applied permanently to the character signal generating circuit 3.

Referring to FIG. 3, the character vertical timing signal generating circuit 4 is connected to receive a specified character destroying signal SCD obtained from the collision detecting circuit 6. The character destroying signal SCD is applied to a variable number control circuit 41. The variable number control circuit 41 is, for example, responsive to the signal SCD being the high level or the logic one to vary a preset value in a character subvertical counter 42 to move the character symbol group 11 shown in FIG. 1 in the vertical direction on the screen and is responsive to the signal SCD being the low level or the logic zero to fix a preset. value in the character subvertical counter 42. The signal from the variable number control circuit 41 is applied to the subvertical counter 42 for the character symbol group. The vertical reference clock CL2 is applied to the count input of the subvertical counter 42. The count value in the subvertical counter 42 is applied in a bit parallel fashion to a character vertical position decoder 43. The vertical position decoder 43 may comprise a read-only memory, as in case of the horizontal timing decoder 203 and the vertical timing decoder 205. The vertical position decoder 43 is adapted to decode the count value in the subvertical counter 42 to provide the vertical addressing signals CV1 to CV6 (and CV7) for the character signal generating circuit 3 in association with the count value. At the same time, the vertical position decoder 43 provides a vertical timing signal TV for each vertical timing. The variable number control circuit 41 is responsive to the signal SCD being the high level or the logic one to vary a variable set of values associated with the number of the scanning lines in the subvertical counter 42. As a result, the character group 11 shown in FIG. 1 is caused to move downward on the screen 10. If and when the signal SCD is the low level or the logic zero, the subvertical counter 42 functions as a 262-nary counter in a fixed manner.

In order to display a ball symbol 12 on the screen 10 as shown in FIG. 1, a ball symbol signal generating circuit 5 is provided. The ball symbol signal generating circuit 5 is shown in more detail in FIG. 4. The ball symbol signal generating circuit 5 shown in FIG. 4 comprises a horizontal direction circuit 51 and a vertical direction circuit 52. The circuits 51 and 52 each comprise variable number control circuits 511 and 521, a ball symbol subhorizontal counter 512 and a ball symbol subvertical counter 522, and a ball symbol horizontal position decoder 513 and a ball symbol vertical position decoder 523, respectively. The ball symbol signal generating circuit 5 is connected to receive the reference clock signal CL1 from the clock generating circuit 201 and a horizontal collision signal HC from the collision detecting circuit 6 for use in the horizontal direction circuit 51 and the vertical reference clock CL2 from the horizontal timing decoder 203 and a vertical collision signal VC from the collision detecting circuit 6 for use in the vertical direction circuit 52. The ball symbol signal generating circuit 5 is further connected to receive a signal BD/E obtained from the collision detecting circuit 6 and representing whether or not the ball symbol 12 is to be displayed.

Since the horizontal direction circuit 51 and the vertical direction circuit 52 are substantially the same construction, only the horizontal direction circuit 51 will be described. The ball symbol subhorizontal counter 512 is connected to receive the reference clock CL1 at the count input thereto. The preset value associated with the number of the horizontal scanning lines and the speed of the counting operation of the ball symbol subhorizontal counter 512 are controlled by the variable number control circuit 511. The count value in the subhorizontal counter 512 is applied in a bit parallel fashion to the ball symbol horizontal position decoder 513. The decoder 513 provides an output when the code value in the counter 512 reaches a given value. Thus, as the preset value and the counting speed of the subhorizontal counter 512 are varied by the variable number control circuit 511, the phase and synchronization of the ball symbol horizontal position signal obtained from the decoder 513 are accordingly changed. The ball symbol horizontal position signal obtained from the decoder 513 is applied to one input of a three-input AND gate 53. Another input of the AND gate 53 is connected to receive a ball symbol vertical position signal obtained from the ball symbol vertical position decoder 523. The ball display/extinguish signal BD/E obtained from the collision detecting circuit 6 is applied to the remaining inverted input of the AND gate 53. Accordingly, if and when the horizontal direction collision signal HC and/or the vertical direction collision signal VC are obtained from the collision detecting circuit 6, a ball symbol signal is obtained from the AND gate 53 in which the moving direction and the moving speed of the ball symbol 12 shown in FIG. 1 have been changed. The ball symbol signal is applied to the collision detecting circuit 6 and also to the video synthesizing circuit 231.

Figure 5A:
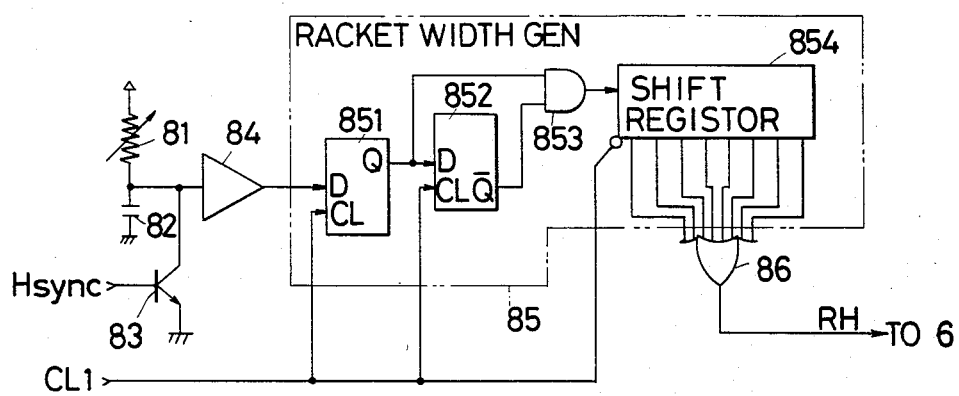
FIG. 5A is a block diagram showing in more detail a racket symbol signal generating circuit.

FIG. 5A is a block diagram showing in detail a racket symbol signal generating circuit 8. The racket symbol signal generating circuit 8 comprises a series connection of a variable resistor 81 a resistance value of which may be varied by operation of the racket operation knob 27 shown in FIG. 1 and a capacitor 82. The junction of the variable resistor 81 and the capacitor 82 is connected through a transistor 83 to the ground and is connected to an amplifier 84. The input electrode cf the transistor 83 is connected to receive a horizontal synchronizing signal HSYNC obtained from the horizontal timing decoder 203. The amplifier 84 is supplied with a given slice level voltage eV. The output of the amplifier 84 is applied to a data input of a flip-flop 851 included in a racket width generating circuit 85. The flip-flop 851 and another flip-flop 852 and a shift resistor 854 are supplied with the reference clock CL1. The output of the flip-flop 851 is applied to a data input of the flip-flop 852 and is also applied to one input of an AND gate 853. Another input of the AND gate 853 is connected to receive the inverted output of the flip-flop 852. The output of the AND gate 853 is applied to an input of the shift resistor 854. The shift resistor 854 serves as a serial-parallel converter to provide the converted output in a bit parallel fashion. The bit parallel output of the shift resistor 854 is withdrawn through an OR gate 86 and the output of the OR gate 86 is applied to one input of an AND gate 87 (FIG. 2) as a racket horizontal position signal RH. Another input of the AND gate 87 is connected to fixedly receive the racket symbol vertical position signal RV from the vertical timing decoder 205.

Figure 5B:
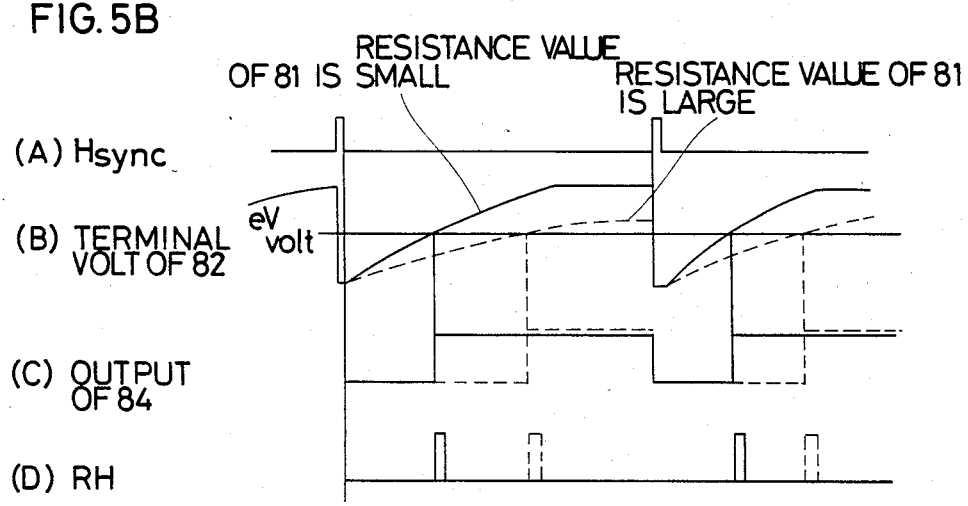
FIG. 5B is a graph showing the waveforms for explaining the operation of FIG. 5A.

Now referring to FIG. 5B, an operation of the FIG. 5A diagram will be briefly described. The capacitor 82 is discharged responsive to the horizontal synchronizing signal HSYNC (FIG. 5B(A)), whereupon the capacitor 82 is charged thereafter through the variable resistor 81. Accordingly, a saw-tooth wave voltage (FIG. 5B(B)) is generated, which has a waveform including an abrupt fall defined by discharging of the capacitor 82 in synchronism with the horizontal synchronizing signal HSYNC and a ramp rise defined by charging of the capacitor 82 with a time constant determined by the variable resistor 81 and the capacitor 82. The saw-tooth wave voltage is sliced at a predetermined slice level of the amplifier 84 and the output (FIG. 5B(C)) is applied to the racket width generating circuit 85. The racket width generating circuit 85 serves to perform a digital differentiation, thereby to provide in a bit parallel fashion a signal representing the width of the racket from the shift resistor 854 included in the racket width generating circuit 85. Thus, the horizontal position signal RH of the racket symbol having a racket width determined by the racket width generating circuit 85 is withdrawn from the OR gate 86. By manually operating the knob 27 shown in FIG. 1, the resistance value of the variable resistor 81 can be changed and accordingly the gradient of the ramp rise of the sawtooth wave voltage applied to the amplifier 84 can be changed. Accordingly, the phase position of the sawtooth wave voltage as sliced by the amplifier 84 is accordingly changed and thus the phase of the horizontal position signal RH of the racket symbol obtained from the OR gate 86 is also changed. As a result, the racket symbol 13 having the width determined by the circuit 85 is position controllable in the horizontal direction by manually operating the knob 27 to change the resistance value of the variable resistor 81. The racket symbol signal for displaying the racket symbol is obtained from the AND gate 87 of the racket symbol signal generating circuit 85 and is applied to the collision detecting circuit 6 and also to the video synthesizing circuit 231.

Figure 6:
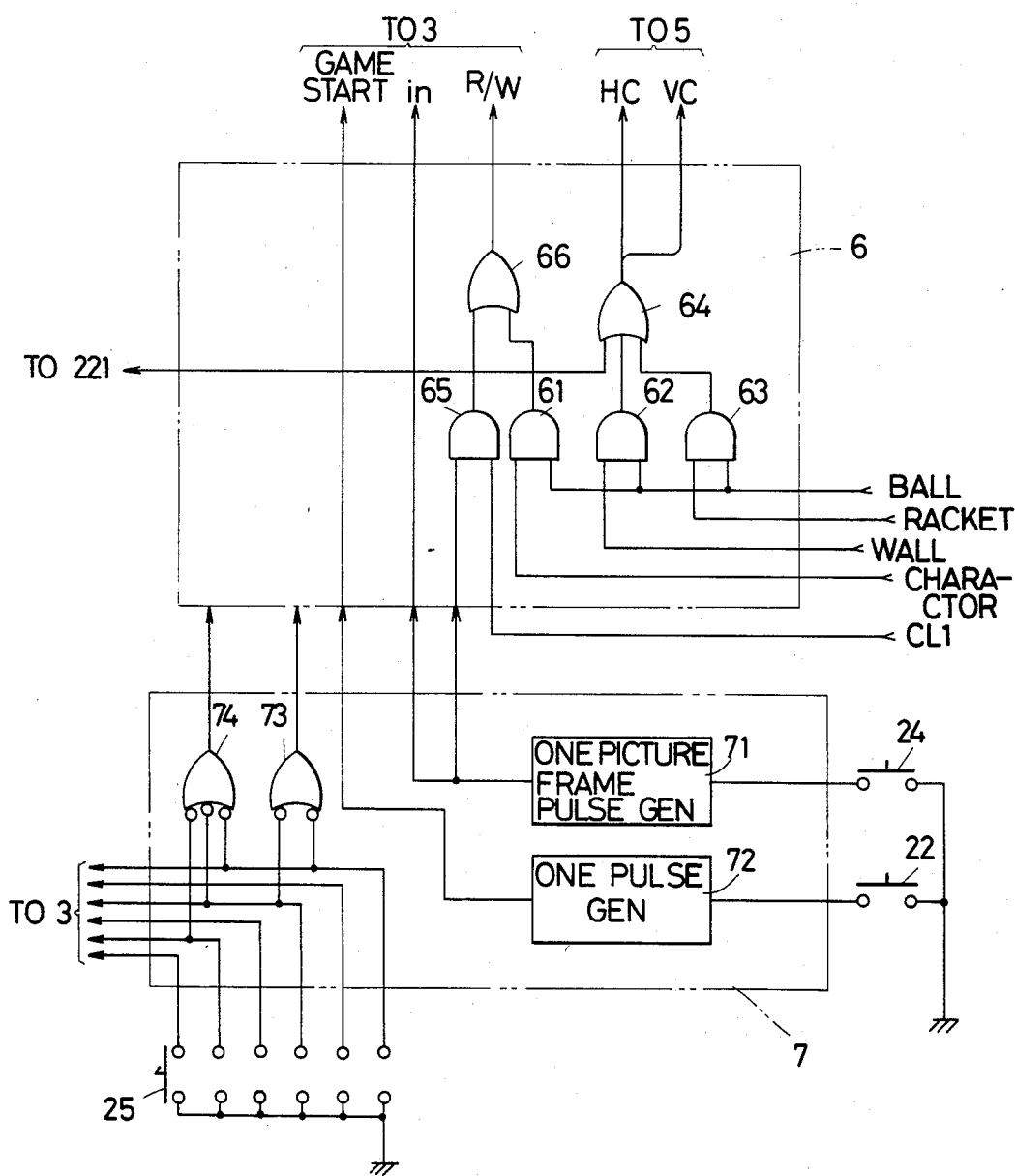
FIG. 6 is a block diagram showing in more detail a collision detecting circuit and a game control circuit of interest to the present invention.

FIG. 6 is a block diagram showing an outline of a major portion of the collision detecting circuit 6 and the game control circuit 7. The game control circuit 7 is connected to the serve switch 22, to the reset switch 24 and to the game selection switch 25 shown in FIG. 1. The game control circuit 7 comprises a one picture frame pulse generating circuit 71 responsive to depression of the reset switch 24 to provide a one picture frame pulse. The one picture frame pulse generating circuit 71 generates a one picture frame pulse of the high level during one recirculation period of the main vertical counter 204. The one picture frame pulse obtained from the one picture frame pulse generating circuit 71 is applied as a write enable input to the character generating circuit 3, as to be more fully described subsequently, and also to an AND gate 65 included in the collision detecting circuit 6 as one input thereto. The game control circuit 7 comprises a one-pulse generating circuit 72 responsive to depression of the serve switch 22 to generate one pulse. The pulse obtained from the one-pulse generating circuit 72 is applied, as a game starting pulse, to the character symbol generating circuit 3, the character vertical timing signal generating circuit 4, the ball symbol signal generating circuit 5, the collision detecting circuit 6, a score counter 222 and the like, thereby to return them to an initial condition. The game selection switch 25 may comprise a slide switch, so that a change of an on contact position can select the kinds of games. The selection signal obtained from the switch 25 is applied to the character symbol signal generating circuit 3, for example. At the same time, the signal representing a selected kind of game is applied as inverted inputs to OR gates 73 and 74. These OR gates 73 and 74 are provided to apply the signals to the collision detecting circuit 6 such that the collision condition to be detected by the collision detecting circuit 6 may be changed in association with the selected kind of game.

The collision detecting circuit 6 detects a coincidence between the ball symbol signal and the character symbol signal, the racket symbol signal and the wall symbol signal. Coincidence of these last mentioned signals with the ball symbol signal can be observed as a collision of a ball symbol 12 with the block in the block group 11, the racket symbol 13 or the wall symbol, not shown. In order to detect such coincidence and thus collision, the collision detecting circuit 6 comprises AND circuits 61, 62 and 63. The AND circuit 61 is connected to receive the ball symbol signal and the character symbol signal. The AND circuit 62 is connected to receive the ball symbol signal and the wall symbol signal. The AND circuit 63 is connected to receive the ball symbol signal and the racket symbol signal. Accordingly, the AND circuits 61, 62 and 63 serve to detect coincidence between the ball symbol signal and the character symbol signal, the wall symbol signal and the racket symbol signal, respectively. These AND circuits 61, 62 and 63 each comprise those for the vertical direction and those for the horizontal direction and the outputs thereof are also withdrawn separately as those for the vertical direction and those for the horizontal direction. However, FIG. 6 has been illustrated by only one line to denote both the vertical direction and the horizontal direction for simplicity of illustration. The collision detected signals obtained from these AND circuits 61, 62 and 63 are applied to an OR circuit 64. Although the OR circuit 64 also comprises two circuits for the horizontal direction and the vertical direction, again the same is shown as one in the figure for simplicity of illustration. The output of the AND circuit 61 for detecting coincidence of the ball symbol signal and the character symbol signal is further applied to OR gate 66. Another input of the OR gate 66 is connected to receive the output of an AND gate 65. Another input of the AND gate 65 is connected to receive the reference clock CL1. The output of the OR gate 66 is applied to a random-access memory, not shown, included in the character signal circuit 3 as a read/write command signal R/W. At the same time, the output of the AND gate 61 is applied to a score pulse generating circuit 221. The horizontal direction collision detected signal HC and the vertical direction collision detected signal VC obtained from the OR circuit 64 are applied to the ball symbol signal generating circuit 5. The output from the OR gate 73 or 74 of the game control circuit 7 is applied to the AND circuits 61, 62 and 63 thereby to change the coincidence detecting condition achieved by these circuits 61, 62 and 63.

Referring again to FIG. 2, the score pulse generating circuit 221 is connected to receive a coincidence detected output of the ball symbol signal and the character signal obtained from the collision detecting circuit 6 and also to receive the addressing signal obtained from the character vertical timing signal generating circuit 4. Accordingly, a pulse train of the pulses corresponding to the score of the character corresponding to the address is provided from the score pulse generating circuit 221. The score pulse train obtained from the score pulse generating circuit 221 is counted by the score counter 222 and the count value is applied to the score symbol signal generating circuit 223. The score symbol signal generating circuit 223 provides a signal for displaying the score as shown in FIG. 1 together with the horizontal position signal PH and the vertical position signal PV to the video synthesizing circuit 231.

The video synthesizing circuit 231 receives the ball symbol signal, the wall symbol signal, the racket symbol signal, the character signal and the score symbol signal, thereby to compose them to provide a composite brightness signal. The above described signals are also applied to a chrominance circuit 232. Accordingly, the chorminance circuit 232 generates a chrominance signal in association with these input signals, which is applied to a phase modulation circuit 233. The phase modulation circuit 233 generates a color signal which is phase modulated in response to the reference clock signal CL1 obtained from the clock generating circuit 201. The color signal obtained from the phase modulation circuit 233, the brightness signal obtained from the video synthesizing circuit 231, and a sound signal obtained from a sound signal generating circuit 234 for generating a sound signal responsive to a collision detected signal obtained from the collision detecting circuit 6 are applied to a synthesizing circuit 235, whereby these signals are combined in a television high frequency signal. The television high frequency signal output from the synthesizing circuit 235 is applied to a television receiver through the connection code 21 (FIG. 1). Since the circuitry constituting the background of the present invention was described in the foregoing, a characteristic circuit portion of the present invention will be described in detail in the following.

Figure 7:
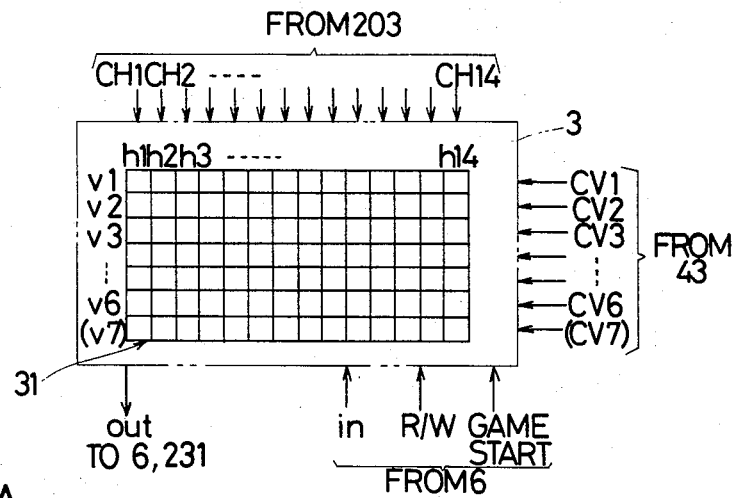
FIG. 7 is a view diagrammatically showing one example of a random-access memory included in the character signal generating circuit.

FIG. 7 is a diagrammatic view showing storing regions in a random-access memory 31 included in the character signal generating circuit 3. The random-access memory 31 comprises storing regions, each constituting one bit, of the number corresponding to the block symbols included in the block group 11 shown in FIG. 1. More specifically, the random-access memory 31 comprises 84 storing regions and thus 84 bits, arranged in fourteen columns in the horizontal direction and six rows in the vertical direction. The random-access memory 31 is loaded with the logic one in the corresponding bit representing that the corresponding character or the block symbol is to be displayed and logic zero in the corresponding bit representing that the corresponding character 11 or the block symbol is not to be displayed. In the initial condition of a game, the random-access memory is loaded with the logic one in all the bit positions by means of a write control means to be described below. Hence, initially all characters or blocks 11 are displayed.

If and when a repulsing block symbol (character) group 11' is to be displayed, beneath the racket symbol 13 at the bottom of the screen, as shown by a dotted line in FIG. 1, the arrangement of the block symbols must comprise seven rows in the vertical direction and hence the total number of storing regions must be 98 bit in the RAM 31. The repulsing block symbol group 11' serves to prevent the ball symbol 12 from disappearing when a player fails in hitting the ball symbol 12 with the racket symbol 13. More specifically, without the block symbol group 11', the ball symbol 12 not hit and thus not repulsed by the racket symbol 13 ultimately reaches the bottom end of the televison picture screen 10 to disappear therefrom. However, with the repulsing block symbol group 11' provided, the ball symbol 12 not repulsed by the racket symbol 13 reaches one of the block symbols in the block symbol group 11' and is repulsed thereby, while said block is extinguished, so that the ball symbol 12 not hit by the racket symbol 13 is saved by the block symbol in the block symbol group 11' only one time and the ball symbol 12 is repulsed toward the character group 11. However, as described above, the block symbols in the block symbol group 11' shown in a dotted line are extinguished when the ball symbol 12 collides therewith and accordingly the ball symbol 12 moving downward not hit by the racket symbol 13 is allowed to pass downward at the place where the block symbol of the block symbol group 11' is extinguished.

The random-access memory 31 included in the above described character signal generating circuit 3 is addressed by the horizontal addressing signals CH1 to CH14 and the vertical addressing signals CV1 to CV6 (and CV7) obtained from the horizontal timing decoder 203 and the character vertical timing signal generating circuit 4.

Figure 8A:
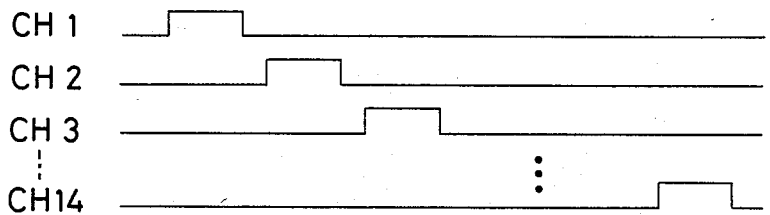
FIG. 8A is a timing chart showing one example of the timing signals obtained from the horizontal timing decoder.

More specifically, the horizontal timing decoder 203 does not provide the horizontal address signal during a time period of the count value "0" to "29" in the main horizontal counter 202 when the horizontal scanning is progressing. The decoder 203 provides a horizontal address signal CH1 (FIG. 8A) specifying the horizontal directional address No. 1 of the random-access memory 31 during the period of the count value "30" to "33" in the counter 202 (i.e. a period corresponding to the horizontal directional width of the character or block symbol in the first column from the left side in the character group 11). Further, the decoder 203 does not provide an addressing signal at the count value of "34" of the main horizontal counter 202 but it provides an addressing signal CH2 (FIG. 8A) for specifying the horizontal directional address No. 2 during the time period of the count value "35" to "38" in the main horizontal counter 202. The decoder 203 does not provide an addressing signal at the count value of "39" of the main horizontal counter 202. Similarly, thereafter, the decoder 203 repeats an operation wherein the decoder 203 provides addressing signals CH3 to CH14 specifying the horizontal directional addresses during the time periods when the count value "4" is stepped in the horizontal counter 202 and the decoder 203 does not provide an addressing signal during a time period for counting the count value "1" immediately thereafter, with the result that fourteen pulses of the addressing signals CH1 to CH14 are applied to the random-access memory 31 in a time sequence and such an operation is repeated for each scanning line.

Figure 8B:
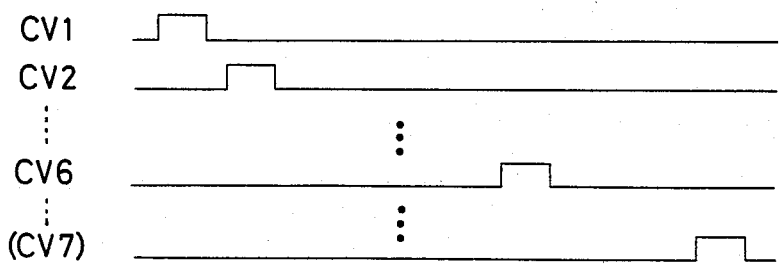
FIG. 8B is a timing chart showing one example of the timing signals obtained from the vertical position decoder.

The vertical position decoder 43 (FIG. 3) included in the character vertical timing signal generating circuit 4 does not provide a vertical addressing signal during the time period of the count value "0" to "64" in the main vertical counter 204 and does provide a vertical addressing signal CV1 (FIG. 8B) specifying the vertical address No. 1 in the random-access memory 31 during a time period of the count value "65" to "70" in the counter 204. The decoder 43 does not provide a vertical addressing signal during a time period of the count value "71" and "72" in the main vertical counter 204 but it does provide the vertical addressing signal CV2 during the time period of the count value "73" to "78" in the main vertical counter 204. Thereafter the decoder 43 does not provide a vertical addressing signal during a time period of the count value "79" and "80". Similarly thereafter, the decoder 43 provides the vertical addressing signals CV3 to CV6 (and CV7) for specifying the vertical addresses No. 3 to 6 (and No. 7) in the random-access memory during the time periods of the count values shown in FIG. 8B. Thus, the information stored in the respective storing regions or bits in the random-access memory 31 is addressed in the horizontal direction by the decoder 203 and it is addressed in the vertical direction by the decoder 43 for read out in a bit sequence from the output terminal (out), and the information is applied as a character signal. Meanwhile, it is necessary to load the logic one in an initial condition of a game in all the bits or storing regions in the random-access memory 31 included in the circuit 30. Therefore, writing or loading of the logic one in the respective bits in the random-access memory 31 for displaying the corresponding characters will be described in the following. To that end the reset switch 24 shown in FIG. 6 is depressed. Then, the one-picture frame pulse of the logic one is obtained from the one-picture frame pulse generating circuit 7 during one vertical scanning period. Accordingly, the signal is applied by the collision detecting circuit 6 to the circuit 30 as a write input signal "in". At the same time, the one-picture frame pulse obtained from the one-picture frame pulse generating circuit 71 is applied to the AND gate 65 of the collision detecting circuit 6. Accordingly, the high level output or the logic one is obtained from the AND gate 65 for each of the reference clock signals CL1. Therefore, the output of the logic one is obtained from the OR gate 66 included in the circuit 6 for each of the reference clock signal CL1 and is applied to the random-access memory 31 as a write command signal. The random-access memory 31 is addressed by the horizontal addressing signals CH1 to CH14 obtained from the horizontal timing decoder 203 and the vertical addressing signals CV1 to CV6 (and CV7) obtained from the decoder 43 of the vertical timing signal generating circuit 4. Accordingly, upon depression of the reset switch 24 by a player after completion of a play of one game, the logic one is loaded in the respective bits as sequentially addressed in the random-access memory 31 during the subsequent one-picture frame pulse period. If and when the one-picture frame pulse obtained from the one-picture frame pulse generating circuit 71 assures the low level or the logic zero, the low level or the logic zero is applied to the write input signal "in". On the other hand, a read command of the low level or the logic zero is applied as a read/write input of the random-access memory 31. Accordingly, thereafter the information is sequentially read out from the bits sequentially addressed by the horizontal timing decoder 203 and the vertical position decoder 43 at the output terminal out from the random-access memory 31 and thus from the character signal generating circuit 3. The character signal as read is applied to the collision detecting circuit 6 and the video synthesizing circuit 231. Accordingly, the characters or the block symbols are displayed on the television screen 10 as shown in FIG. 1. As described above, the collision detecting circuit 6 serves to detect collision of the ball symbol with the wall symbol, the racket symbol and the block symbols.

If and when the ball symbol 12 collides with the character on the screen 10, the output of the logic one is obtained from the AND circuit 61 of the collision detecting circuit 6. The output of the AND circuit 61 is applied through the OR gate 66 to the circuit 30 as a write command of the random-access memory 31. On the other hand, since the input terminal "in" has been already the logic zero, the logic zero is written in the respective bit position in the random-access memory 31 corresponding to the character with which the ball symbol 12 collided. Accordingly, thereafter, the character symbol is extinguished from the television screen 10. At the same time, the output of the AND circuit 61 is applied to the score pulse generating circuit 221 and accordingly the score of a play now in progress is added to the score display 14 on the television screen and the sum thereof is displayed.

As described above, in case where the information, i.e. the logic one, representing that the character in the character group is to be displayed, is written in the random-access memory 31, the logic one may be simply written in all the bit positions in the random-access memory 31. Therefore, a conventional memory such as a read-only memory for fixedly storing an arrangement pattern of characters can be dispensed with and hence the necessity for a write control circuit for transferring information from such a read-only memory to a video random-access memory is eliminated. As a result, the circuit configuration can be extremely simplified and an initial condition of a display of a character group can be simply achieved. Furthermore, since the random-access memory 31 may simply comprise the bit positions of the number corresponding to the number of characters in the character group, the necessary storage capacity of the random-access memory 31 can be reduced to approximately 1/350 as compared with a case where the display information signal is stored in a memory having storage capacity corresponding to all the picture elements on the screen. As a result, the present invention considerably reduces the cost of the memory. Another feature of the embodiment is that since in reading information stored in the random-access memory 31 the memory 31 is addressed in a hardware manner as a horizontal directional position of the scanning lines and a vertical directional position, the necessity of performing a reading operation by the use of a microprocessor is eliminated which reduces the number of operation steps to be performed by a microprocessor. Accordingly, this feature makes it possible to utilize a microprocessor having a lower operational speed which is hence less expensive.

In the above described embodiment a cathode ray tube is used in combination with a television receiver as an example of a display for displaying by horizontal and vertical scanning. However, any other type of displays suitable for displaying by horizontal and vertical scanning may be utilized. Furthermore, although the above embodiments were described with reference to displaying rectangular block symbols, such block symbols may be of any other configuration, such as a square, for example. Furthermore, although in the foregoing the embodiments are described with reference to a case wherein one character is allotted to one bit in a random-access memory in order to store a character symbol, alternatively it may be adapted so that one character is stored with a relatively lesser number of bits in a random-access memory. For example, a square character may be stored in one bit and a rectangle character corresponding to an arrangement of two squares in the horizontal direction may be stored using two bits. In this case, a circuit may be configured such that a horizontal addressing signal is generated to cover two bits corresponding two square characters with no horizontal addressing signal for the following one bit as a space. Thus, even if a circuit is configured such that one character is stored in a relatively smaller number of bit positions in a random-access memory, the necessary storage capacity of a random-access memory can be considerably reduced as compared with a conventional system. If and when a circuit is configured such that selectively a random-access memory is addressed with two bits for two squares followed by one bit for a space, or a random-access memory is addressed with one bit for one square followed by one bit for space, the manner of display can be simply switched among rectangle characters and square characters.

Figure 9:
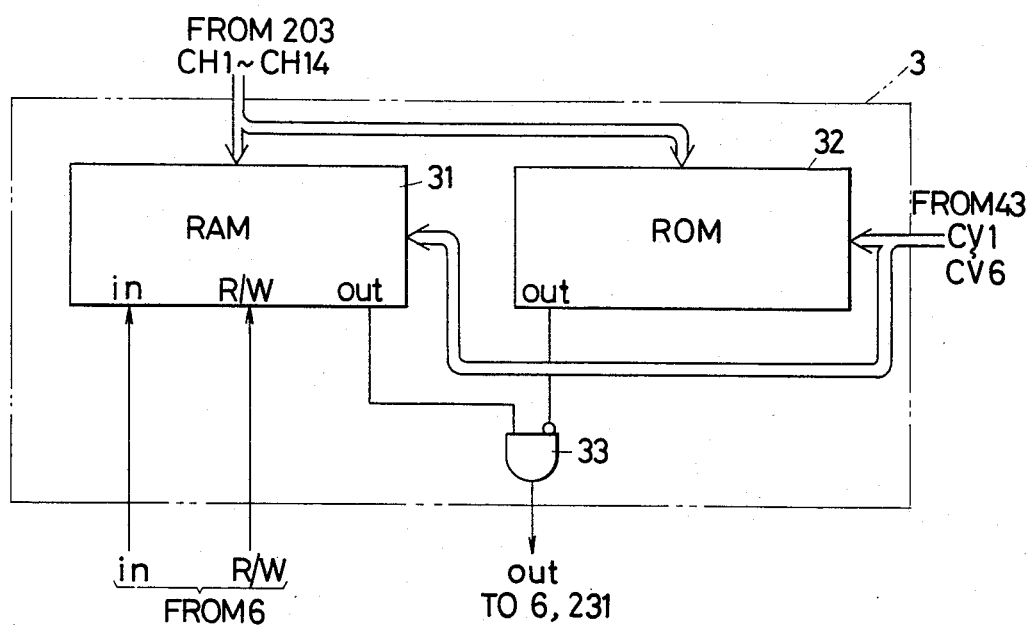
FIG. 9 is a block diagram showing another embodiment of the character signal generating circuit.
Figure 10A:
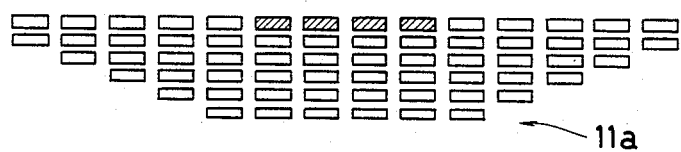
FIG. 10A is a diagram showing one example of a character arrangement pattern that can be displayed with the circuit of FIG. 9.
Figure 10B:
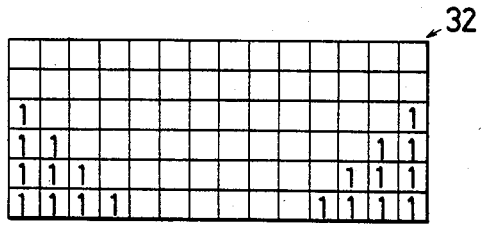
FIG. 10B is a view diagrammatically showing the read-only memory for storing the character arrangement pattern shown in FIG. 10A.

FIG. 9 is a block diagram showing another embodiment of the present invention for changing an arrangement pattern of the character group. To that end, a read-only memory 32 for storing arrangement patterns is provided in addition to the random-access memory 31 shown in FIG. 7 in the character signal generating circuit 3 shown in FIG. 2. The read-only memory 32 as well as the random-access memory 31 is addressed by the horizontal addressing signals CH1 to CH14 obtained from the horizontal timing decoder 203 and the vertical addressing signals CV1 to CV6 (and CV7) obtained from the vertical position decoder 43 included in the character vertical timing signal generating circuit 4. The read output OUT from the random-access memory 31 is applied to one input of an AND gate 33. The read output of the read-only memory 32 for storing an arrangement pattern is applied to an inverted input of the AND gate 33. The output of the AND gate 33 is withdrawn as a character symbol signal and is applied to the collision detecting circuit 6 and the video synthesizing circuit 231 (FIG. 2). FIG. 10A is a view showing an example of an arrangement pattern of the character group. The arrangement pattern 11a comprises a pattern of a reversed trapezoid shape wherein the characters have been deleted starting from the third line from the top downward one by one at both sides sequentially. Such pattern 11a is stored in the arrangement pattern storing read-only memory 32. The read-only memory 32 comprises a plurality of bits or bit positions arranged in plural rows and plural columns corresponding to plural rows of characters and plural columns of characters in the character group, as shown in FIG. 10B. The logic zero is written in the bits corresponding to the characters being displayed, while the logic one is written in the bits corresponding to the characters not being displayed.

The character symbol signal is generated from the circuit 3 by the use of the random-access memory 31, the arrangement pattern storing read-only memory 32 and the AND gate 33, as described previously. In an initial condition, the random-access memory 31 is loaded with the logic one in all the bits, as described above. The writing operation is performed in the same manner as described above. In order to generate a character signal from the circuit 3, a read command signal is applied to the random-access memory 31. Then the random-access memory 31 and the read-only memory 32 are simultaneously addressed by the same addressing signals. The output read from the random-access memory 31 and the inverted output read from the read-only memory 32 are ANDed by the AND gate 33. It is pointed out that if and when the read-only memory 32 is structured such that, as in case of a random-access memory 31, the logic one is written in the bits corresponding to the characters being displayed, then the output read from the random-access memory 31 and the output read from the read-only memory 32 may be ANDed, without any necessity for inverting the output read from the read-only memory 32. The output of the AND gate 33 is used as a character signal. Accordingly, in case where the logic one has been written in a given bit in the random-access memory 31 and the logic one has been written in the corresponding bit in the read-only memory 32, the output from the AND gate 33 becomes the logic zero and accordingly the character corresponding to the bit is not displayed on the screen 10 (FIG. 1). On the other hand, in case where the logic zero has been written in a given bit in the random-access memory 31, the output of the AND gate 33 becomes the logic zero, irrespective of the logical state in the corresponding bit in the read-only memory 32. Conversely, if and when the logic one has been written in a given bit in the random-access memory 31 and the logic zero has been written in the corresponding bit in the read-only memory 32, then the output of the AND gate 33 becomes the logic one. Accordingly, the character corresponding to the bit is displayed on the screen 10.

Accordingly, it will be appreciated that in an initial condition an arrangement pattern as shown in FIG. 10A is displayed based on the information stored in the read-only memory 32 as shown in FIG. 10B.

When a block game machine is implemented using a character signal generating circuit 3 using the above described random-access memory 31, the read-only memory 32 and the AND gate 33, the way of playing a game may be substantially the same as described above, in which, when the ball symbol 12 collides with the character, the character is extinguished on the screen 10, while the score corresponding to the extinguished character is added and the total score is displayed.

FIG. 11A shows an example of a different arrangement pattern of the character group and FIG. 11B diagrammatically shows an arrangement of bits in the read-only memory 32 corresponding to the arrangement pattern shown in FIG. 11A.

Preferably, the circuit is so constructed that the arrangement patterns 11A and 11B shown in FIGS. 10A and 11A may be selected. FIG. 12 is a block diagram showing another embodiment of the character signal generating circuit 3 performing such a selective display among a plurality of arrangement patterns. The embodiment shown is so constructed that four characters, as hatched, among those characters shown in FIGS. 10A and 11A, blink so as to attract the attention of a player. Referring to FIG. 12, the arrangement pattern storing read-only memory 32 comprises 168 bits in 12 rows in the vertical direction and 14 columns in the horizontal direction ($12 \times 14 = 168$ bits). The same vertical addressing signals CV1 to CV6 are applied to a plurality of rows, as shown in FIG. 12. The horizontal addressing signals CH1 to CH14 are individually applied, as described above. The information stored in the upper five rows V1 to V5 in the read-only memory 32 is denoted as a region A, the information stored in the sixth row V6 is denoted as a region B, the information stored in the seventh to tenth rows V7 to V10 is denoted as a region C, and the information stored in the eleventh and twelfth rows V11 and V12 is denoted as a region D, respectively. Referring to FIG. 12, the dot as blanked represents that the logic zero has been loaded. The output read from the region A in the read-only memory 32 is applied to one input of an AND gate 301 included in the circuit 3. The output read from the region B in the read-only memory 32 is applied to one input of an AND gate 302. Similarly, the output read from the region C and the output read from the region D are applied to one input of the AND gates 303 and 304, respectively.

An arrangement pattern selection switch 251 is provided to be switchable in a ganged fashion with the game selection switch 25 shown in FIG. 6, for example. The contact 251s of the selection switch 251 is connected to the high level or logic one and the contact 251a of the selection switch 251 is connected to the other input of the AND gates 301 and 302. The contact 251b of the selection switch 251 is connected to the other input of the AND gates 303 and 304. The outputs of the AND gates 301 and 303 are both connected to the input of an OR gate 305 and the output of the OR gate 305 is applied, after an inversion by an inverter 307, to an AND gate 33. The AND gate 33 is a three-input gate. Another input of the AND gate 33 is connected to receive the output as sequentially read from the random-access memory 31, as described above. The outputs of the AND gates 302 and 304 are both applied to an OR gate 306. The output of the OR gate 306 is applied to one input of an AND gate 308. Another input of the AND gate 308 is connected to receive the pulse from the pulse generator 309. The pulse generator 309 is provided to cause a specified character to blink and the frequency of the pulse is selected such that the blink of a specified character can be visually observed. The output of the AND gate 308 is applied to the remaining input of the AND gate 33. The output of the AND gate 33 is withdrawn as the output of the circuit 3, i.e. a character signal.

The bit position corresponding to the character which is caused to blink is loaded with the logic one representing that the character is to be caused to blink. Now let it be assumed that the arrangement pattern shown in FIG. 10A is selected by the switch 251. Then the AND gates 301 and 302 corresponding to the regions A and B including the information associated with the pattern 11A are enabled. The corresponding bits are sequentially addressed by the horizontal addressing signals CH1 to CH14 and the vertical addressing signals CV1 to CV6 and accordingly a read signal is obtained. The read signal obtained from the region A is inverted by the inverter 307 and an output signal is obtained, whereby the logic one indicates that the corresponding characters are to be displayed and the logic zero indicates that the corresponding characters are not to be displayed. The read signal obtained from the region B is withdrawn as a signal of the bits corresponding to the characters that are to be caused to blink and the signal representing the blinking characters and a blink displaying pulse obtained from the pulse generator 309 are ANDed by the AND gate 308 and the output of the AND gate 308 is applied to the AND gate 33. The output of the inverter 307, the output of the AND gate 308 and the read signal of the corresponding bits of the random-access memory 31 are ANDed by the AND gate 33. Accordingly, the characters corresponding to the bits wherein the logic one has been loaded in the region A are not displayed and the characters corresponding to the bits wherein the logic one has been loaded in the region B are caused to blink. Thus, a selection made by means of the selection switch 251, permits the selective displaying of the character group 11a in the arrangement pattern shown in FIG. 10A.

Similarly, in order to display the arrangement pattern 11b shown in FIG. 11A, the selection switch 251 is switched to the contact 251b and then the character group of the pattern 11b shown in FIG. 11A is displayed on the screen 10 in a similar manner.

According to the FIG. 12 embodiment, a plurality of kinds of arrangement patterns of the character group 11 can be selectively displayed, using a read-only memory of a relatively small storage capacity. Accordingly, versatility of the game can be achieved by employing such a circuit configuration in a character signal generating circuit of a television game machine.

Although in the foregoing the embodiments were described as comprising six rows of storing regions in each of the arrangement patterns 11a and 11b, if each of both patterns 11a and 11b contains rows of the same contents, for example the seventh row V7 and the tenth row V10 are the same, the circuit may be constructed so that such rows V7 and V10 are implemented in a common row and the same is addressed by different vertical addressing signals, in which case the storage capacity of the read-only memory 32 can be further decreased. It is pointed out that the same could also be applied to different patterns 11a and 11b.

Figure 13:
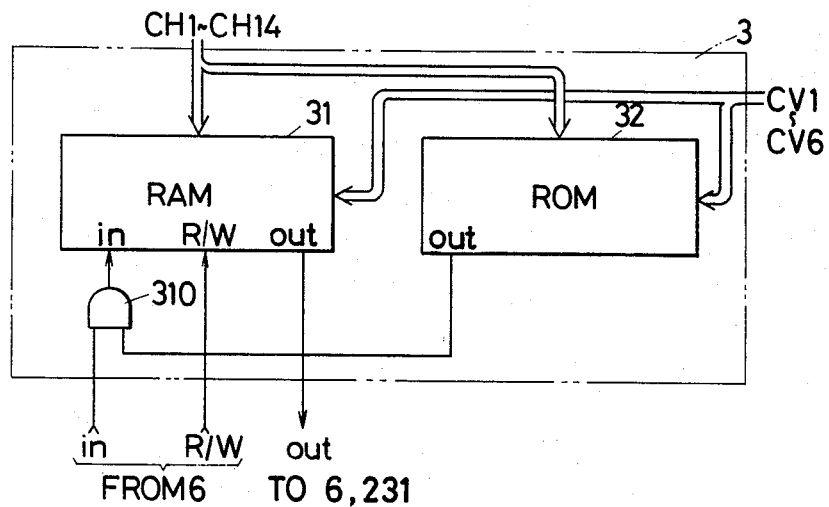
FIG. 13 is a block diagram showing a further embodiment of a character signal generating circuit, wherein a character signal of a predetermined arrangement pattern is written in the random-access memory as an initial condition.

In the embodiments shown in FIGS. 9 and 12 the random-access memory included in the character symbol signal generating circuit 3 is loaded with the logic one in all the bit positions as an initial condition, whereupon in reading the same the output of the random-access memory 31 and the output of the arrangement pattern storing read-only memory 32 are ANDed to provide a character symbol signal. However, alternatively, the circuit may be configured such that the random-access memory 31 is loaded with the logic one or logic zero as a function of the arrangement pattern stored in the read-only memory 32. FIG. 13 is a block diagram of an embodiment employing such an alternative circuit configuraton. In case of the embodiments shown in FIGS. 9 and 12, in writing information as an initial condition, the signal of the one-picture frame pulse generating circuit 71 (FIG. 6) is applied as a write input IN. By contrast, in the FIG. 13 embodiment, the output of the one-picture frame pulse generating circuit 71 is applied to an AND gate 310. Another input of the AND gate 310 is connected to receive the output read from the arrangement pattern storing read-only memory 32. The output of the AND gate 310 is applied as a write input IN of the random-access memory 31. Accordingly, the random-access memory 31 is loaded in the bit position as addressed by the horizontal addressing signals CH1 to CH14 and the vertical addressing signals CV1 to CV6 with the data stored in the read-only memory 32. The read output OUT of the random-access memory 31 is withdrawn as the output of the circuit 3 and thus the character symbol signal is withdrawn. Accordingly, as an initial condition, the character group of the arrangement pattern such as a pattern 11a shown in FIG. 10A or the pattern 11b, shown in FIG. 11A can be displayed on the screen 10 (FIG. 1) as an initial condition, as in the embodiments shown in FIGS. 9 and 12.

Although in the above described embodiments the characters being displayed on the screen 10 were of a rectangle shape, the characters may be of any configuration.

Figure 14:
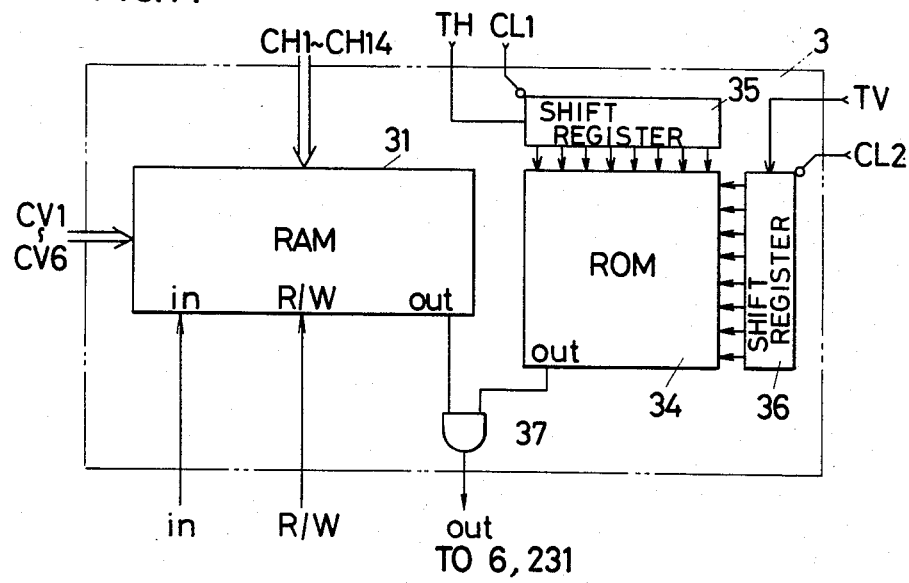
FIG. 14 is a block diagram showing still a further embodiment of a character signal generating circuit adapted for displaying characters each having a given configuration.
Figure 16A:
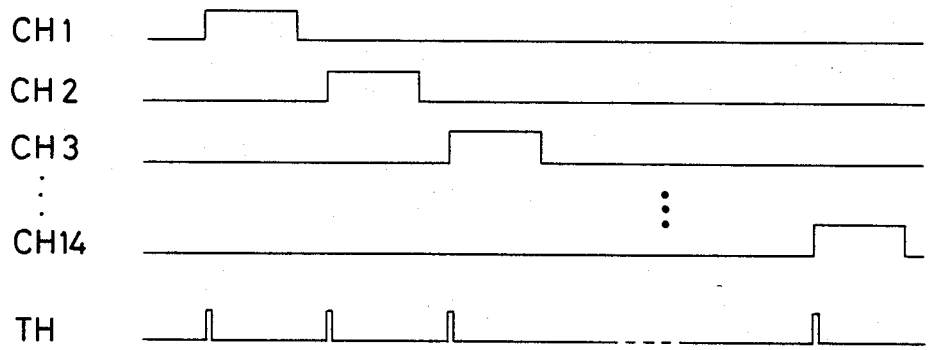
FIGS. 16A & 16B are timing charts showing the horizontal timing TH and the vertical timing TV, respectively.
Figure 16B:
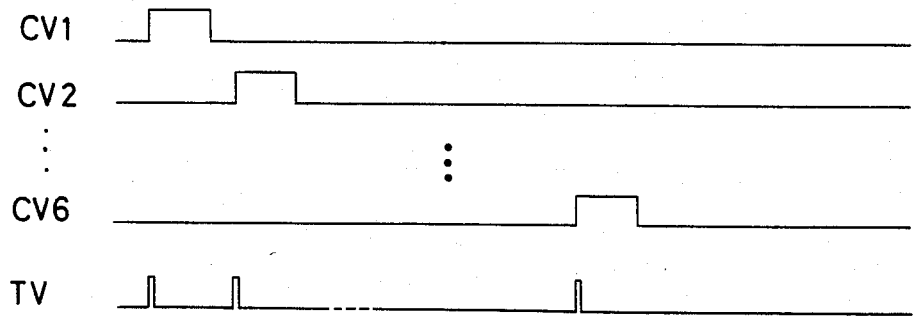

FIG. 14 is a block diagram showing an embodiment for defining a configuration of characters. The embodiment shown comprises a read-only memory 34 for storing a character configuration, in addition to the random-access memory 31 in the character signal generating circuit 3 shown in FIG. 2, for example. The read-only memory 34 is adapted to be addressed by eight-bit ring counters or shift registers 35 and 36. The read output of the random-access memory 31 and the read output of the character configuration storing read-only memory 34 are applied to the inputs of an AND gate 37 and the output of the AND gate 37 is withdrawn as the output of the circuit 3 and thus as the character symbol signal. The random-access memory 31 is supplied with the horizontal addressing signals CH1 to CH14 obtained from the horizontal timing decoder 203 and the vertical addressing signals CV1 to CV6 obtained from the vertical position decoder 43 (FIG. 3). The shift resistor 35 is supplied with the reference clock signal CL1 as a shift clock pulse and the input thereof is connected to receive the horizontal timing signal TH (FIG. 2) obtained from the horizontal timing decoder 203. The timing signal TH is obtained by extracting the leading edges of the horizontal addressing signals CH1 to CH14, as shown in FIG. 16A. The shift resistor 36 is supplied with the vertical reference clock CL2 as the shift clock pulse thereof. The input of the shift resistor 36 is connected to receive the vertical timing signal TV (FIG. 16B) obtained from the vertical position decoder 43 (FIG. 3). The character configuration storing read-only memory 34 is addressed in the horizontal direction by the shift resistor 35 and is addressed in the vertical direction by the shift resistor 36. Accordingly, the read-only memory 34 of the embodiment shown in FIG. 14 comprises 64 bits.

Figure 15A:
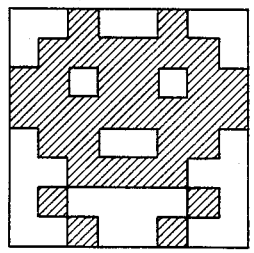
FIG. 15A shows one example of a character pattern configuration.
Figure 15B:
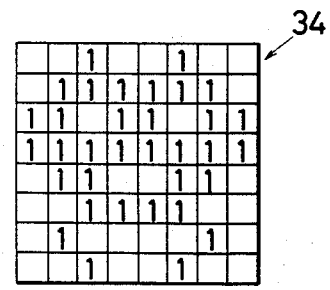
FIG. 15B is a view diagrammatically showing the read-only memory for storing the character configuration shown in FIG. 15A.

FIG. 15A is a view showing an example of such a character configuration. The read-only memory 34 is loaded with the logic one or zero in accordance with the character configuration, as shown in FIG. 15B. The read-only memory 34 is addressed in the horizontal direction by the shift resistor 35 making one recirculation for the horizontal addressing signals CH1 to CH14 and is addressed in the vertical direction by the shift resistor 36 making one recirculation for the vertical addressing signals CV1 to CV6. Accordingly, during a time period when one bit of the random-access memory 31 is read, the information stored in all the bits in the read-only memory 34 is sequentially read out. If and when the read output in the bit in the random-access memory 31 is the logic one, the signal associated with the data stored in the read-only memory 34 is provided from the AND gate 37. The signal thus obtained is applied to the video synthesizing circuit 231 and the character group of the characters each having the character configuration as shown in FIG. 15A is displayed on the television screen 10 (FIG. 1).

Figure 17:
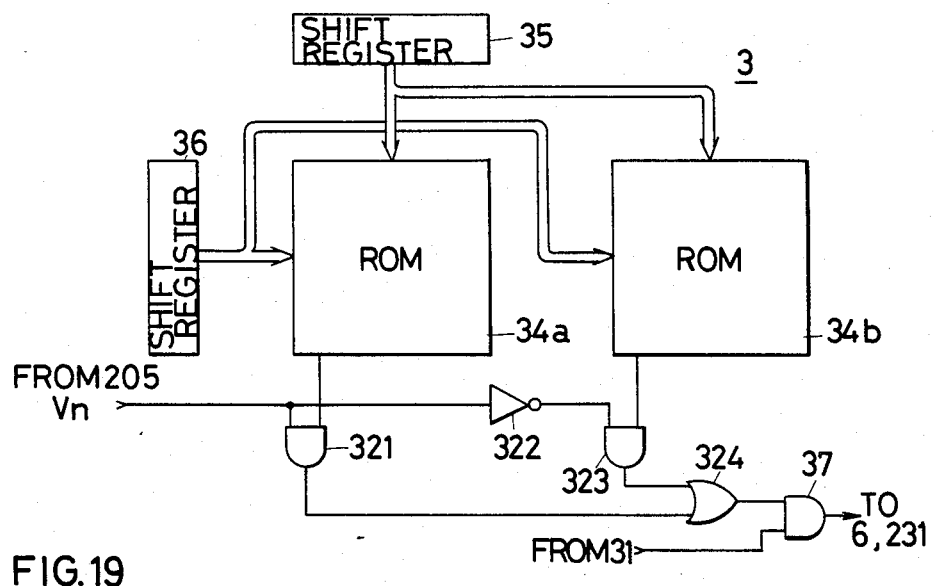
FIG. 17 is a block diagram showing an embodiment wherein two kinds of character configurations can be selected.

FIG. 17 is a block diagram showing an embodiment adapted for selectively displaying two kinds of character configurations. The FIG. 17 embodiment is so constructed that a read-only memory 34A stores a character configuration as shown in FIG. 15A and a read-only memory 34B stores a character configuration shown in FIG. 18A. The read output of a read-only memory 34A is applied to one input of an AND gate 321 and the read output of the read-only memory 34B is applied to one input of an AND gate 323. A timing signal Vn of a relatively long period corresponding to several vertical scannings is provided by the vertical timing decoder 205 shown in FIG. 2, for example. The period of the timing signal Vn is selected such that a change of a character configuration on the television screen can be perceived. The timing signal Vn is applied to another input of the AND gate 321 and, through an inverter 322, to another input of the AND gate 323. The outputs of these AND gates 321 and 323 are applied to one input of an AND gate 37 through an OR gate 324. Accordingly, each time the timing signal Vn obtained from the vertical timing decoder 205 is switched, the read output of either the read-only memory 34a or 34b is applied to the AND gate 37. As a result, the configuration of the character symbol displayed on the screen 10 is changed between the character configuration shown in FIG. 15A and the character configuration shown in FIG. 18A.

FIG. 18B to 18E show modified examples of character configurations. Thus, it will be appreciated that character configurations can be selected as desired according to the embodiment.

Figure 18A:
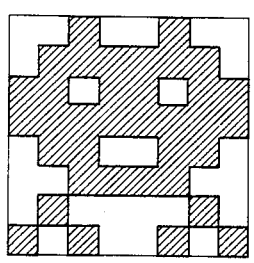
Figure 18B:
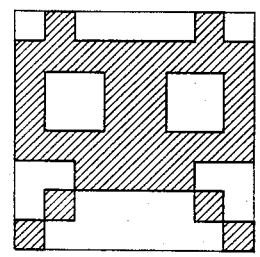
Figure 18C:
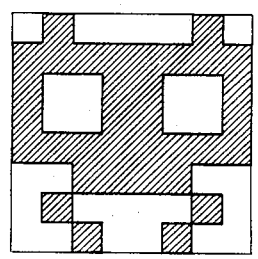
Figure 18D:
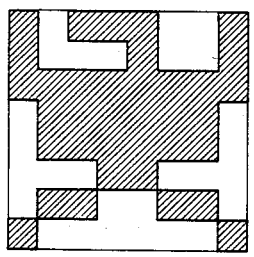
Figure 18E:
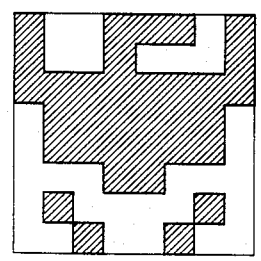

FIG. 19 is a block diagram showing an embodiment adapted for selectively displaying three kinds of character configurations. In the embodiment shown, the vertical addressing signals CV1 to CV6 are utilized for a selective display. Thus, the characters of the character configuration shown in FIG. 15A are displayed in the first and second rows of the character arrangement, the characters of the character configuration shown in FIG. 18A are displayed on the third and fourth rows of the character arrangement, and the characters of the character configuration shown in FIG. 18B are displayed on the fifth and sixth rows of the character arrangement. The structure and operation of other portions of the embodiment shown are substantially the same as those of the FIG. 17 embodiment and, therefore, detailed description thereof will be omitted.

Thus, it will be appreciated that the configuration of the character symbols being displayed can be displayed and selected as desired. According to the embodiment shown, any particular software processing as required in a conventional system can be dispensed with, by simply utilizing a read-only memory for storing character configurations. Such a read-only memory for storing character configurations may be simple and have a relatively small number of bit positions. Thus, by employing such a character symbol signal generating circuit 3 in a television game machine, a variety of games can be played.

FIG. 20 is a block diagram showing a further embodiment of the present invention comprising in combination the random-access memory 31 for storing information representing whether or not characters are to be displayed, the read-only memory 32 for storing the arrangement pattern as described in conjunction with FIGS. 9 and 13, and the read-only memory 34 for storing the character configurations as described in conjunction with FIG. 14 (and FIGS. 17 and 19). The read output of the random-access memory 31 and the read outputs of the read-only memories 32 and 34 are applied to an AND gate 38. The output of the AND gate 38 is obtained as the output signal of the circuit 3 and thus as a character symbol signal. Since the operation of the FIG. 20 embodiment can be readily understood by simultaneous consideration of the operations of previously described embodiments, it is not believed necessary to describe the same in more detail. According to the FIG. 20 embodiment, the characters of the character configuration as shown in FIG. 15A can be displayed as a character group of an arrangement pattern as shown in FIG. 10A, while the character configuration of the characters can be changed as shown in FIGS. 18A to 18E.

Although the present invention has been described and illustrated in detail, it is clearly understood, that the same is by way of illustration and example only and is not to be taken by way of limitation, the spirit and scope of the present invention being limited only by the terms of the appended claims.

Now supplementing the foregoing description, some detailed description will be given on how the ball symbol 12 and the racket symbol 13 can be moved on the display screen.

Fundamentally, the movement of the ball symbol 12 depends on difference in the count period between a counter having a fixed count period and a counter having a variable count period. The main horizontal counter 202 and the main vertical counter 204 (FIG. 2) serve as counters of fixed count periods, while the subhorizontal counter 512 and the subvertical counter 522 (FIG. 4) serve as counters of variable count periods. Movement in the horizontal direction is controlled by the counters 202 and 512, while the movement in the vertical direction is controlled by the counters 204 and 522. Now description is made of only the movement in the horizontal direction, while description on the movement in the vertical direction is omitted inasmuch as the same may be considered in the same manner as that in the horizontal directional movement.

Figure 4:
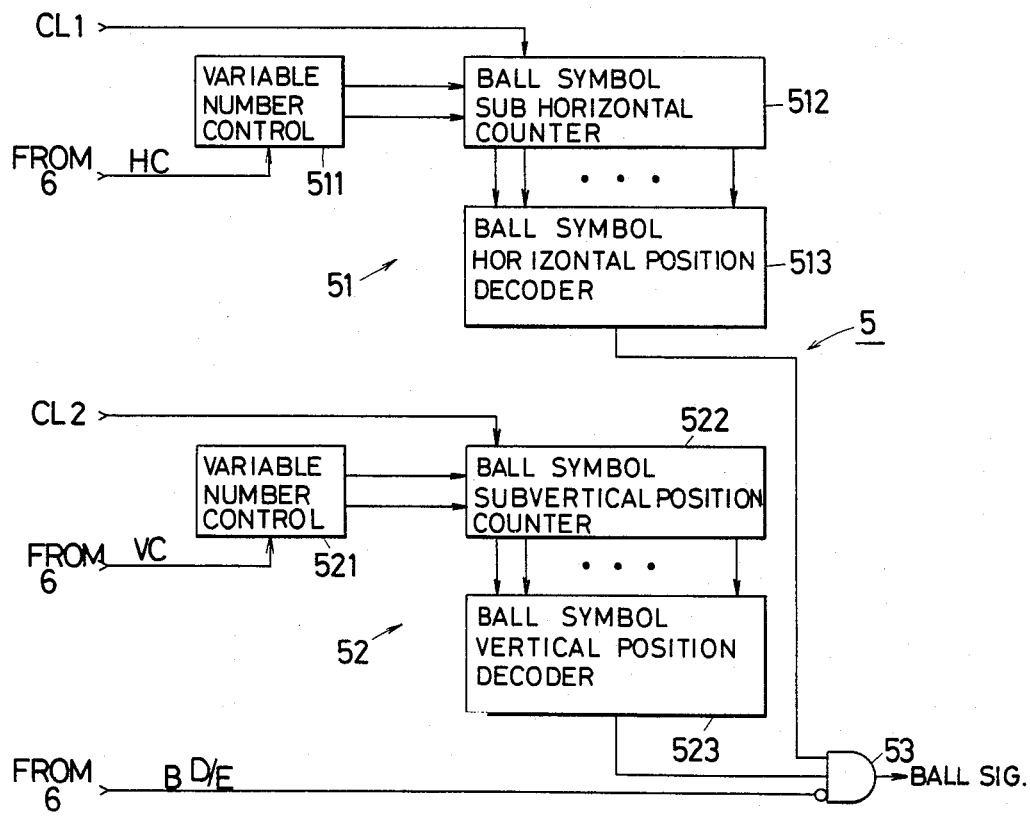
FIG. 4 is a block diagram showing in more detail a ball symbol signal generating circuit.

By operating the serve switch 22 (FIG. 1), for example, a reset pulse is accordingly applied to the two counters 202 and 512. Accordingly, the ball symbol 12 is displayed at a predetermined position on the screen determined by the horizontal position decoder (read-only memory) 513 (FIG. 4).

Now let it be assumed that the count period of the subhorizontal counter 512 has been set to be "X+1" by the variable number controlling circuit 511 (FIG. 1) and the count period of the main horizontal counter 202 of the fixed count period has been set to be "X". The two counters 202 and 512 receive the same clock pulse CL1 as a count input thereto. The main counter 202 is reset each time the plurality "X" of the clock pulses CL1 are counted, whereby the same returns to 0. Since the sub-counter 512 is not reset unless the count value becomes equal to "X+1", the count period thereof is delayed by the period of one clock CL1 as compared with the main counter 202. While such count operation continues, the above described delay is increased each time the count period is repeated and accordingly the ball symbol position set by the decoder 513 is also gradually shifted on the screen. More specifically, although the output of the decoder 513 receiving the output of the subhorizontal counter 512 provides the same position signal (timing signal) with respect to the same count value of the counter 512, the count period of the subcounter 512 is gradually delayed as compared with the main counter 202, whereby the ball symbol 12 is seen as moving in the right direction (FIG. 1) when the ball symbol 12 is displayed on the screen in response to the timing signal from the decoder 513.

If and when the count period of the subcounter 512 had been set to be "X−1", the ball symbol 12 could have been seen as moving in the left direction on the screen.

By changing the count value in the subcounter 512 to be "X+2", "X+1", "X−1" and "X−2" by the variable number controlling circuit 512, the moving speed and the moving direction of the ball symbol 12 are controlled. More specifically, when the amount of the difference between the count periods of both counters 201 and 512 becomes large, the speed is increased and vice versa.

By applying such thought to the vertical direction and by processing the outputs from the decoders 513 and 523 by the AND gate 53, the output of the AND gate 53 becomes a ball symbol signal.

A signal for the racket symbol 13 is obtained from the racket symbol signal generating circuit 8 specifically shown in FIG. 5A.

If and when the charge voltage of the capacitor 82 exceeds a threshold level of the amplifier or Schmidt circuit 84, the output from the circuit 84 rises. The D-type flip-flops 851 and 852 and the AND gate 853 are responsive to the rise of the output from the Schmidt circuit 84 to provide one pulse in synchronism with the clock CL1 (see FIG. 5B). The pulses applied to the shift register 854 and accordingly the count value varying in synchronism with the clock CL1 is obtained in a bit parallel fashion from the shift register 854. The parallel outputs from the shift register 854 are applied to the OR gate 86 and accordingly the output from the OR gate 86 becomes the horizontal component signal RH of the racket symbol 13. Meanwhile, the horizontal directional width of the racket symbol 13 is determined by the number of the output bits of the shift register 854.

In order to display a complete racket symbol on the screen, the signal RH and the output from the vertical timing decoder 205 (FIG. 2) are ANDed by the AND gate 87 (FIG. 2).

The foregoing operation is performed during the one horizontal scanning period and the transistor 83 (FIG. 5A) is turned on in response to the horizontal synchronizing signal (Hsync), whereby the capacitor 82 is discharged.

In order to move the racket symbol 13 in the right direction on the screen, the racket operation knob 27 (FIG. 1) is turned right. Accordingly, the resistance value of the variable resistor 81 (FIG. 5) is increased and accordingly the charging of the capacitor 82 is delayed. By thus changing the resistance value of the variable resistor 81 by the knob 27, the pulse output timing from the Schmidt circuit 84 is changed. Since the capacitor 83 is reset for each synchronizing signal Hsync, the fact that the above described timing is changed means that the position from the start in the horizontal scanning is changed. Accordingly, the racket symbol 13 is displayed on the screen in dependence on the timing and therefore the racket symbol is viewed as moving.

What is claimed is:

1. An apparatus for displaying a group of characters (11) at predetermined positions on a screen of a display by repetitive horizontal and vertical scanning, said screen of said display comprising a relatively large number of dots in the horizontal and vertical directions, respectively, wherein each of said characters (11) includes an arrangement of dots arranged in a plurality of rows in the vertical direction and in a plurality of columns in the horizontal direction on the screen of said display, comprising: first storage means (RAM 31) having storing positions corresponding in number to the number of said characters (11) to be displayed for loading an information signal of one logic state in those storage positions corresponding to characters (11) to be displayed and for loading an information signal of the other logic state in those storage positions corresponding to characters (11) not to be displayed, horizontal direction addressing ring counter means for providing the same row addressing signal continuously and in the form of counting pulses corresponding to the horizontal width of each character (11) on the screen of said display at said predetermined positions, vertical direction addressing ring counter means for providing the same column addressing signal continuously and in the form of further counting pulses corresponding to the vertical width of each character (11) on the screen of said display at said predetermined positions, first reading means for reading said information from said storing positions of said first storage means (RAM 31) as addressed, and converting means responsive to said information indicating whether or not the character read by said first reading means is to be displayed, said converting means converting said information into an electrical signal for displaying said characters (11) at the predetermined positions on the screen of said display corresponding to said information indicating whether or not the character is to be displayed.

2. The apparatus of claim 1, further comprising means for generating first reference clock signals, and wherein said horizontal direction addressing ring counter means comprises horizontal ring counting means responsive to said first reference clock signals for cyclically counting said first reference clock signals corresponding in number to the length in the horizontal direction of said display, horizontal decoding means responsive to the count value in said horizontal counting means for providing a row addressing signal for addressing said row in association with said count value, and wherein said vertical direction addressing ring counter means comprises means responsive to said horizontal ring counting means for providing second reference clock signals at every predetermined number of said first reference clocks, vertical ring counting means responsive to said second reference clocks for cyclically counting said second reference clock signals corresponding in number to the length in the vertical direction of said display means, and vertical decoding means responsive to the count value in said vertical ring counting means for providing a column addressing signal for addressing said column in association with the count value in said vertical ring counting means.

3. The apparatus of claim 2, wherein said horizontal decoding means and said vertical decoding means each comprise a read-only memory responsive to the count values of said horizontal counting means and said vertical counting means for providing said row and column addressing signals.

4. The apparatus of claim 1, wherein first storage means (RAM 31) comprises a random-access memory, said apparatus further comprising means responsive to said first addressing means for loading said logic information representing signals whether or not said character is to be displayed in each of said storing positions of said first storage means (RAM 31).

5. The apparatus of claim 1, wherein said grouped characters comprise a predetermined arrangement pattern, said apparatus further comprising second storage means having storing regions corresponding in number at least to the number of said grouped characters for storing in said storing regions information representative of said arrangement pattern.

6. The apparatus of claim 5, which further comprises second addressing means for sequentially addressing said storing region of said second storage means in association with said horizontal and vertical scanning and in synchronism with addressing of said first storage means by said first addressing means, second reading means responsive to said second addressing means for reading said information representative of said arrangement pattern from said storing regions in said second storage means, and first composing means responsive to said information representing whether or not each said character is to be displayed as read from said storing positions of said first storage means by means of said first reading means and said information representing said arrangement pattern of said grouped characters read from said storing regions of said second storage means by means of said second reading means for composing an arrangement pattern conditioned information representing whether or not each of said characters is to be displayed for displaying said grouped characters in said arrangement pattern.

7. The apparatus of claim 6, wherein said storage positions of said first storage means (RAM 31) correspond in number to the storage regions of said second storage means, wherein said first storage means is loaded with logic information representing that the character (11) is to be displayed in each each of said storing positions, and wherein said second storage means is loaded with information representing that said character (11) is to be prevented from being displayed in predetermined storing positions as determined by said arrangement pattern of the characters.

8. The apparatus of claim 7, wherein said first composing means comprises logical product means for processing the output of said first reading means and the output of said second reading means in a logical product manner.

9. The apparatus of claim 5, wherein said first storage means comprises a random-access memory (RAM 31), and which further comprises first writing means responsive to said first addressing means and to the output of said second reading means of said second storage means for writing the output of said second reading means containing logic information representing whether or not the character is to be displayed in each of said storing positions of said first storage means in accordance with said arrangement pattern stored in said second storage means, whereby logic information representing whether or not the character is to be displayed is stored in each of said storing positions in said first storage means in accordance with said arrangement pattern.

10. The apparatus of claim 5, wherein said second storage means comprise means for storing information concerning a plurality of kinds of arrangement patterns, and selecting means for selecting one of said plurality of arrangement patterns.

11. The apparatus of claim 10, wherein said second storage means comprises a plurality of storage regions for storing said plurality of kinds of arrangement patterns, and wherein said selecting means comprises selective enabling means for selectively enabling one of said plurality of storage regions in said second storage means.

12. The apparatus of claim 10, wherein said second storage means comprises a plurality of storage regions for storing information components each uniquely representing each of said plurality of kinds of arrangement patterns, and a common region for commonly storing an information component which is common to said plurality of kinds of arrangement patterns, and wherein said selecting means is adapted for selectively enabling said plurality of storage regions and commonly enabling said common region, whereby the required storage capacity of said second storage means is reduced.

13. The apparatus of claim 10, wherein said first storage means comprises a random-access memory, and which further comprises writing means responsive to said selecting means for rewriting each storing position of said first storage means as addressed by said first addressing means logic information representing whether or not the character is to be displayed as read from one of said region of said second storage means as selectively enabled by said selecting means in accordance with the arrangement pattern stored in said region of said second storage means as selectively enabled by said selecting means.

14. The apparatus of claim 1, wherein said group of characters (11) comprise a predetermined arrangement pattern of characters, said apparatus further comprising second storage means (32) having storing regions corresponding in number to at least the number of said grouped characters for storing in said storing regions logic information representative of said arrangement pattern, second addressing means for sequentially addressing said storing regions of said second storage means in association with said horizontal and vertical scanning and in synchronism with the addressing of said first storage means (RAM 31) by said first addressing means, second reading means responsive to said second addressing means for reading said information representative of said arrangement pattern from said storing regions, of said second storage means, and third storage means (34) for storing logic information concerning a character configuration of each of said characters being displayed on the screen of said display, said third storage means comprising a plurality of storing positions, the logic information stored in said plurality of storing positions defining a character configuration of each of said characters being displayed, third reading means for reading said information representing said character configuration from said third storage means, and composing means responsive to said information representing whether or not each said character is to be displayed as read from said first storage means (RAM 31) by said first reading means, said logic information representing said arrangement pattern of said grouped characters read from said storing positions of said second storage means by said second reading means and said logic information representing said character configuration read from said third storage means by means of third reading means for composing information representing whether or not each said character is to be displayed in said arrangement pattern and in said character configuration.

15. The apparatus of claim 14, wherein said composing means comprises logical product means for processing the output of said first reading means, the output of said second reading means and the output of said third reading means in a logical product manner.

16. The apparatus of claim 14, wherein said grouped characters comprise an arrangement of characters arranged in plural columns in the vertical direction and plural rows in the horizontal direction on the screen of said display, said storing positions of said first storage means and said storing regions of said second storage means being arranged correspondingly in plural columns and plural rows, and wherein said addressing means comprises horizontal direction addressing means for addressing said rows in the horizontal direction and vertical direction addressing means for addressing said columns in the vertical direction.

17. The apparatus of claim 16, which further comprises means for generating first reference clock signals, and wherein said horizontal direction addressing means comprises horizontal counting means responsive to said first reference clock signals for cyclically counting said first reference clock signals of the number associated with the length in the horizontal direction of said display, horizontal decoding means responsive to the count value in said horizontal counting means for providing a row addressing signal for addressing said rows in association with said count value, wherein said vertical direction addressing means comprises means responsive to said horizontal counting means for providing a second reference clock signal at every predetermined number of said first reference clock signals, vertical counting means responsive to said second reference clock signals for cyclically counting said second reference clock signals of the number associated with the length in the vertical direction of said display, and wherein vertical decoding means are responsive to the count value in said vertical counting means for providing a row addressing signal for addressing said columns in association with the count value in said vertical counting means.

18. The apparatus of claim 17, wherein said horizontal decoding means comprise means for continuously providing the same row addressing signal during a time period when the count value in said horizontal counting means corresponds to the width in the horizontal direction of each character on the screen of said display, and wherein said vertical decoding means comprise means for continuously providing the same column addressing signal during a time period when the count value in said vertical counting means corresponds to the width in the vertical direction of each character on the screen of said display.

19. The apparatus of claim 14, wherein said second storage means comprise means for storing information concerning a plurality of kinds of arrangement patterns, and which further comprises selecting means for selecting one of said plurality of arrangement patterns.

20. The apparatus of claim 19, wherein said third storage means comprise means for storing a plurality of character configurations, and which further comprises character configuration selecting means for selectively reading one of said plurality of character configurations stored in said third storage means.

21. A television game apparatus for displaying at predetermined positions on a display screen of a television receiver by repetitive horizontal and vertical scanning, grouped characters (11), a moving symbol (12) moving on said screen and a position controllable symbol (13), comprising: first storage means (RAM 31) having storing positions corresponding in number to the number of said characters (11) to be displayed, each first storage means including means for individually storing logic information representing whether or not the character corresponding to each said storing positions is to be displayed on said display screen, horizontal direction addressing ring counter means for providing the same row addressing signal continuously and corresponding to the width of each character in the horizontal direction on the display screen, vertical direction addressing ring counter means for providing the same column addressing signal continuously and corresponding to the width of each character in the vertical direction on the display screen, first reading means for reading said information from said storing positions of said first storage means as addressed, moving symbol signal generating means for generating a moving symbol signal for causing a display of a moving symbol on the screen of said display at said predetermined positions, position controllable symbol signal generating means for generating a position controllable symbol signal for causing a display of a position controllable symbol on the screen of said display at said predetermined position, position controlling means coupled to said position controllable symbol signal generating means for controlling the position of said position controllable symbol displayed on the display screen, and converting means responsive to said information representing whether or not the corresponding character is to be displayed as read from said reading means for converting said information into an electrical signal for displaying said characters on the screen of said display at the positions on the screen of said display corresponding to said information representing that the character is to be displayed.

22. The apparatus of claim 21, further comprising means for generating first reference clock signals, and wherein said horizontal direction addressing ring counter means comprises horizontal ring counting means responsive to said first reference clock signals for cyclically counting the number of said first reference clock signals associated with the length in the horizontal direction of said display screen, horizontal decoding means responsive to the counted number in said horizontal counting means for providing a row addressing signal for addressing said rows in accordance with said counted number, wherein said vertical direction addressing ring counter means comprises means responsive to said horizontal ring counting means for providing a second reference clock signal at every predetermined number of said first reference clock signals, vertical ring counting means responsive to said second reference clock signals for cyclically counting the number of said second reference clock signals in accordance with the length in the vertical direction of said display screen, and vertical decoding means responsive to the counted number in said vertical ring counting means for providing a column addressing signal for addressing said rows in accordance with the counted number in said vertical counting means, 23. The apparatus of claim 21, wherein said horizontal decoding means and said vertical decoding means each comprise a read-only memory responsive to the count values of said horizontal counting means and to said vertical counting means for providing said row and column addressing signals.

24. The apparatus of claim 21, wherein said first storage means comprises a random-access memory (RAM 31), and which further comprises means responsive to said first addressing means for loading said information representing whether or not said character is to be displayed in each of said storing positions of said first storage means.

25. The apparatus of claim 24, further comprising resetting means for providing a reset signal, and picture frame pulse generating means responsive to said reset signal obtained from said resetting means for providing a pulse defining a time period corresponding to the period required for horizontal and vertical scanning of at least one picture frame of the screen of said display, and wherein said first writing means comprise means for writing said logic information representing whether or not each of said characters is to be displayed in each of said storing positions of said first storage means (RAM 31) as an initial condition during said time period of said picture frame pulse obtained from said picture frame pulse generating means.

26. The apparatus of claim 25, wherein said first reading means comprise means for initiating the reading operation of each of said storing positions of said first storage means upon termination of said picture frame pulse obtained from said picture frame pulse generating means.

27. The apparatus of claim 26, further comprising collision detecting means for detecting a collision of said moving symbol and at least one of said grouped characters on the display screen, and wherein said writing means is responsive to the collision detected output of said collision detecting means to write information representing that the character is not to be displayed in the storing position of said first storage means corresponding to the character with which said moving symbol collided.

28. The apparatus of claim 27, wherein said collision detecting means comprises logical product means for processing said information read from said first storage means by said first reading means and said moving symbol signal obtained from said moving symbol signal generating means.

29. The apparatus of claim 21, wherein said grouped characters comprise a predetermined arrangement pattern, and which apparatus further comprises second storage means having storing regions corresponding in number at least to the number of said grouped characters for storing in said storing regions information representative of said arrangement pattern.

30. The apparatus of claim 29, further comprising second addressing means for sequentially addressing said storing regions of said second storage means in association with said horizontal and vertical scanning and in synchronism with addressing of said first storage means by said first addressing means, second reading means responsive to said second addressing means for reading said information representative of said arrangement pattern from said storing regions in said second storage means, and first composing means responsive to said information representing whether or not each said character is to be displayed read from said storing positions of said first storage means by means of said first reading means and said information representing said arrangement pattern of said grouped characters read from said storing positions of said second storage means by means of said second reading means for composing arrangement pattern conditioned information representing whether or not each said character is to be displayed to display said grouped characters in said arrangement pattern.

31. The apparatus of claim 30, wherein said storing positions of said first storage means correspond in number to the storing regions of said second storage means, said first storage means being loaded with information representing that the character is to be displayed in each of all said storing positions, and said second storage means being loaded with information representing that said character is to be prevented from being displayed, in predetermined storing regions as determined by said arrangement pattern of the characters.

32. The apparatus of claim 31, wherein said composing means comprises logical product means for processing the output of said first reading means and the output of said second reading means in a logical product manner.

33. The apparatus of claim 29, wherein said first storage means comprises a random-access memory, and which apparatus further comprises first writing means responsive to said first addressing means and the output of said second reading means of said second storage means for writing the output of said second reading means containing information representing whether or not the character is to be displayed in each of said storing positions of said first storage means in accordance with said arrangement pattern stored in the storing regions of said second storage means, whereby information representing whether or not the character is to be displayed is stored in each of said storing positions in said first storage means in accordance with said arrangement pattern.

34. The apparatus of claim 33, further comprising resetting means for providing a reset signal, and picture frame pulse generating means responsive to said reset signal obtained from said resetting means for providing a pulse defining a time period corresponding to the period required for horizontal and vertical scanning of at least one picture frame of the screen of said display, and wherein said first writing means comprises means for writing said information representing whether or not each said character is to be displayed in each said storing positions of said first storage means as an initial condition during said time period of said picture frame pulse obtained from said picture frame pulse generating means.

35. The apparatus of claim 34, wherein said first reading means comprise means for initiating the reading operation of each said storing position of said first storage means upon termination of said picture frame pulse obtained from said picture frame pulse generating means.

36. The apparatus of claim 35, further comprising collision detecting means for detecting collision of said moving symbol and at least one of said grouped characters on the screen of said display, and wherein said writing means is responsive to the collision detected output of said collision detecting means to write information representing that the character is not to be displayed in the storing position of said first storage means corresponding to the character with which said moving symbol collided, which was detected by said collision detecting means.

37. The apparatus of claim 29, which said second storage means comprise means for storing information concerning a plurality of kinds of arrangement patterns, and which further comprises selecting means for selecting one of said plurality of arrangement patterns.

38. The apparatus of claim 21, wherein said grouped characters comprise a predetermined arrangement pattern, said apparatus further comprising second storage means having storing regions corresponding in number to the number of said grouped characters for storing in said storing regions logic information representative of said arrangement pattern, second addressing means sequentially addressing said storing regions of said second storage means in association with said horizontal and vertical scanning and in synchronism with addressing of said first storage means by said first addressing means, second reading means responsive to said second addressing means for reading said information representative of said arrangement pattern from said storing regions in said second storage means, and third storage means for storing information concerning a character configuration of each said character being displayed on the screen of said display, said third storage means comprising a plurality of storing regions, the information stored in said plurality of storing regions defining a character configuration of each character being displayed, third reading means for reading said information representing said character configuration from said third storage means, and composing means responsive to said information representing whether or not each character is to be displayed as read from said first storage means by means of said first reading means, said information representing said arrangement pattern of said grouped characters read from said storing regions of said second storage means by means of said second reading means and said information representing said character configuration read from said third storage means by means of said third reading means for composing information representing whether or not each said character is to be displayed in said arrangement pattern and in said character configuration.

39. The apparatus of claim 38, wherein said composing means comprises logical product means for processing the output of said first reading means, the output of said second reading means and the output of said third reading means in a logical product manner.

40. The apparatus of claim 38, wherein said first storage means comprises a random-access memory (RAM 31), and which further comprises means responsive to said first addressing means for loading said information representing whether or not said character is to be displayed in each of said storing positions of said first storage means.

41. The apparatus of claim 40, further comprising resetting means for providing a reset signal, and picture frame pulse generating means responsive to said reset signal obtained from said resetting means for providing a pulse defining a time period corresponding to the period required for horizontal and vertical scanning of at least one picture frame of the screen of said display, and wherein said first writing means comprising means for writing said information representing whether or not each said character is to be displayed in each said storing position of said first storage means as an initial condition during said time period of said picture frame pulse obtained from said picture frame pulse generating means.

42. The apparatus of claim 41, wherein said first reading means comprise means for initiating the reading operation of each said storing position of said first storage means upon termination of said picture frame pulse obtained from said picture frame pulse generating means.

43. The apparatus of claim 42, further comprising collision detecting means for detecting collision of said moving symbol and at least one of said grouped characters on the screen of said display, and wherein said writing means are responsive to the collision detected output of said collision detecting means for writing information representing that the character is not to be displayed in the storing position of said first storage means corresponding to the character with which said moving symbol collided, which was detected by said collision detecting means.

44. The apparatus of claim 38, wherein said grouped characters comprise an arrangement of characters arranged in plural columns in the vertical direction and plural rows in the horizontal direction on the screen of said display, said storing positions of said first storage means and said storing regions of said second storage means comprise an arrangement of storing positions and regions arranged correspondingly in plural rows and plural columns, and wherein said addressing means comprises horizontal direction addressing means for addressing said rows in the horizontal direction and vertical direction addressing means for addressing said columns in the vertical direction.

45. The apparatus of claim 44, further comprising means for generating first reference clock signals, and wherein said horizontal direction addressing means comprises horizontal counting means responsive to said first reference clock signals for cyclically counting a number of said first reference clock signals associated with the length in the horizontal direction of said display screen, horizontal decoding means responsive to the count value in said horizontal counting means for providing a row addressing signal for addressing said rows in association with said count value, and wherein said vertical direction addressing means comprises means responsive to said horizontal counting means for providing a second reference clock signal at every predetermined number of said first reference clock signals, vertical counting means responsive to said second reference clock signals for cyclically counting a number of said second reference clock signals associated with the length in the vertical direction of said display screen, and vertical decoding means responsive to the counted number in said vertical counting means for providing a column addressing signal for addressing said rows in association with the count value in said vertical counting means.

46. The apparatus of claim 45, wherein said horizontal decoding means comprise means for continuously providing the same row addressing signal during a time period when the count value in said horizontal counting means corresponds to the width in the horizontal direction of each character on the screen of said display, and wherein said vertical decoding means comprise means for continuously providing the same column addressing signal during a time period when the count value in said vertical counting means corresponds to the width in the vertical direction of each character on the screen of said display.

47. The apparatus of claim 38, wherein said second storage means comprise means for storing information concerning a plurality of kinds of arrangement patterns, said apparatus further comprising selecting means for selecting one of said plurality of arrangement patterns.

48. The apparatus of claim 47, wherein said third storage means comprise means for storing a plurality of character configurations, said apparatus further comprising character configuration selecting means for selectively reading one of said plurality of character configurations stored in said third storage means.

49. An apparatus for displaying grouped characters at predetermined positions on the screen of a display through repetitive horizontal and vertical scanning, comprising: first storage means having storing positions corresponding in number to the number of said characters being displayed, each first storage means individually storing information representing whether or not the character corresponding to each of said storing positions is to be displayed on said screen of said display at said predetermined positions, first addressing means for sequentially addressing in association with said horizontal and vertical scanning said storing positions of said first storage means, first reading means for reading said information from said storing positions of said first storage means as addressed by said first addressing means, converting means responsive to said information representing whether or not the character is to be displayed as read by said reading means for converting said information into an electrical signal for displaying said characters on the screen of said display, at predetermined positions on the screen corresponding to said information representing that the character is to be displayed, wherein said grouped characters comprise characters arranged in plural columns in the vertical direction and in plural rows in the horizontal direction on the screen of said display, said first addressing means comprising horizontal direction addressing means for addressing said rows in the horizontal direction and vertical direction addressing means for addressing said columns in the vertical direction, said apparatus further comprising means for generating first reference clock signals, wherein said horizontal direction addressing means comprise horizontal ring counter means responsive to said first reference clock signals for cyclically counting said first reference clock signals to a number associated with the length of said display in the horizontal direction, horizontal decoding means responsive to the count value in said horizontal counting means for providing a row addressing signal for addressing said rows in association with said count value, said vertical direction addressing means comprising means responsive to said horizontal counting means for providing second reference clock signals at every predetermined number of said first reference clock signals, vertical ring counter means responsive to said second reference clock signals for cyclically counting said second reference clocks to the number associated with the length in the vertical direction of said display means, vertical decoding means responsive to the count value in said vertical counting means for providing a column addressing signal for addressing said columns in association with the count value in said vertical counting means, wherein said horizontal decoding means continuously provide the same row addressing signal during a time period when the count value in said horizontal counting means corresponds to the horizontal width of each character on the screen of said display, and wherein said vertical decoding means continuously provide the same column addressing signal during a time period when the count value in said vertical counting means corresponds to the vertical width of each character on the screen of said display.

50. The apparatus of claim 49, wherein said grouped characters are disposed on the screen of said display means in horizontal rows and in vertical column directions, with a horizontal space between two adjacent characters in the horizontal direction and a vertical space between two adjacent characters in the vertical direction, said horizontal decoding means comprising means for preventing the provision of said row addressing signal during a time period when the count value in said horizontal counting means corresponds to said horizontal space between two adjacent characters in the horizontal direction on the screen of said display means, and wherein said vertical decoding means comprising means for preventing the provision of said column addressing signal during a time period when the count value of said vertical counting means corresponds to the vertical space of two adjacent characters in the vertical direction on the screen of said display.

51. The apparatus of claim 49, wherein said horizontal decoding means and said vertical decoding means each comprise a read-only memory responsive respectively to the count values of said horizontal counting means and said vertical counting means for providing said row and column addressing signals.

52. The apparatus of claim 49, wherein said first storage means compirses a random-access memory (RAM 31), said apparatus further comprising means responsive to said first addressing means for loading said information representing whether or not said character is to be displayed in each of said storing positions of said first storage means.

53. The apparatus of claim 49, wherein said grouped characters comprise a predetermined arrangement pattern, said apparatus further comprising second storage means having storing regions corresponding in number at least to the number of said grouped characters for storing in said storing positions of said first storage means information representative of said arrangement pattern.

54. An apparatus for displaying grouped characters at predetermined positions on a screen of a display through repetitive horizontal and vertical scanning, comprising: first storage means having storing positions corresponding in number to the number of said characters being displayed, each first storage means (31) being provided for individually storing information indicating whether or not the character corresponding to each of said storing positions is to be displayed on said screen of said display, first addressing means for sequentially addressing in association with said horizontal and vertical scanning said storing positions of said first storage means, first reading means for reading said information from said storing positions of said first storage means as addressed by said first addressing means, converting means responsive to said information representing whether or not the character is to be displayed as read by said reading means for converting said information into an electrical signal for displaying said characters on the screen of said display at positions on the screen corresponding to said information indicating that the character is to be displayed, said apparatus further comprising second storage means (32) for storing information representing a character configuration of each of said characters being displayed on the screen of said display, said second storage means comprising a plurality of storing regions wherein the information stored in said plurality of storing regions defines a character configuration of each of said characters being displayed, second reading means for reading said information representing said character configuration from said second storage means, composing means responsive to said information indicating whether or not each of said characters is to be displayed as read from said first storage means by means of said first reading means and also responsive to said information representing said character configuration read from said second storage means by means of said second reading means for composing information representing whether or not any one of said characters is to be displayed in said character configuration, wherein said second reading means comprises bit addressing means for sequentially addressing said plurality of storing regions in said second storage means during a time period when said first addressing means is addressing each said storage position of said first storage means, and wherein said bit addressing means comprise column addressing means and row addressing means each of which comprises a respective ring counter (35, 36) for making one recirculation during one column addressing period and one recirculation during one row addressing period, respectively.

55. The apparatus of claim 54, wherein said grouped characters comprise an arrangement of characters located in a plurality of rows in the horizontal direction and in a plurality of columns in the vertical direction on the screen of said display, wherein said first storage means comprises a corresponding arrangement of said storing positions in said plurality of columns and in said plurality of rows, wherein said first addressing means comprises horizontal direction addressing means for addressing said plurality of rows in the horizontal direction and vertical direction addressing means for addressing said plurality of columns in said vertical direction, wherein said bit addressing means of said second reading means comprises row addressing means for sequentially addressing said plurality of bit rows of said second storage means during one row addressing period of said first addressing means by said horizontal direction addressing means, and column addressing means for sequentially addressing said plurality of bit columns of said second storage means during one column addressing period of said first addressing means by said vertical direction addressing means.

56. The apparatus of claim 54, further comprising third storage means (34) for storing a plurality of character configurations, and character configuration selecting means for selectively reading one of said plurality of character configurations stored in said third storage means.

57. The apparatus of claim 56, wherein said character configuration selecting means comprises means for selecting one of said character configurations stored in said third storage means for each addressing signal of said plurality of addressing signals obtained from said first addressing means such that the character configuration may be changed among said plurality of character configurations for each character of said grouped characters.

58. The apparatus of claim 56, wherein said character configuration selecting means comprises means for selecting one of said plurality of character configurations stored in said third storage means for a plurality of addressing signals obtained from said first addressing means such that the character configuration may be changed among said plurality of character configurations for said plurality of characters.

59. The apparatus of claim 56, wherein said character configuration selecting means comprises means for repetitively selecting said plurality of character configurations at such a time period that can be visually perceived on the screen of said display.

60. A television game apparatus for displaying at predetermined positions on a display screen of a television receiver, by repetitive horizontal and vertical scanning, grouped characters (11), a moving symbol (12) moving on said screen, and a position controllable symbol (13), comprising: first storage means (RAM 31) having storing positions corresponding in number to the number of said grouped characters to be displayed, each of said storing positions individually storing information representing whether or not the corresponding character is to be displayed on the display screen, first addressing means for sequentially addressing said storing positions of said first storage means in association with said horizontal and vertical scanning of said television receiver, first reading means for reading said information from each of said storing positions of said first storage means as addressed by said first addressing means moving symbol signal generating means for generating a moving symbol signal for causing a display of a moving symbol on the screen of said display, position controllable symbol signal generating means for generating a position controllable symbol signal for causing a display of a position controllable symbol on the screen of said display, position controlling means coupled to said position controllable symbol signal generating means for controlling the position of said position controllable symbol displayed on the screen of said display, first high frequency signal converting means for composing said information read from said first storage means by means of said first reading means, from said moving symbol signal, and from said position controllable symbol signal for converting the composed signal into a high frequency television signal representative of said composed signal, second storage means for storing information concerning a character configuration of each character being displayed on the screen of said display, said second storage means comprising a plurality of storing regions whereby the information stored in said plurality of storing regions define a character configuration of each of said characters being displayed, second reading means for reading said information representing said character configuration from said second storage means, second composing means responsive to said information representing whether or not each of said characters is to be displayed as read from said first storage means by means of said first reading means and in accordance with said information representing said character configuration as read from said second storage means by means of said second reading means for composing information representing whether or not each character is to be displayed in said character configuration, wherein said second reading means comprises bit addressing means for sequentially addressing said plurality of storing regions in said second storage means during a time period when said first addressing means is addressing each of said storage positions of said first storage means, wherein said grouped characters comprise an arrangement of characters arranged in a plurality of columns in the vertical direction and in a plurality of rows in the horizontal direction on the display screen, said first storage means comprising a corresponding arrangement of said storing positions in said plurality of columns and said plurality of rows, said first addressing means comprising horizontal direction addressing means for addressing said plurality of rows in the horizontal direction and vertical direction addressing means for addressing said plurality of columns in said vertical direction, and wherein said bit addressing means comprises column addressing means for sequentially addressing said plurality of columns during one column addressing period of said horizontal direction addressing means of said first addressing means, and row addressing means for sequentially addressing said plurality of rows during one row addressing period of said vertical direction addressing means of said first addressing means and wherein said column addressing means and row addressing means of said bit addressing means comprise a ring counter (36) for making one recirculation during said one column addressing period and a further ring counter for making one recirculation during said one row addressing period, respectively.

61. The apparatus of claim 60, wherein said grouped characters are disposed on the screen of said display in horizontal rows and in vertical columns, with a horizontal space between two adjacent characters in the horizontal direction and a vertical space between two adjacent characters in the vertical direction, said apparatus further comprising horizontal decoding means comprising horizontal counting means for preventing the provision of a row addressing signal during a time period when a counted number in said horizontal counting means corresponds to a horizontal space between two adjacent characters in the horizontal direction on the display screen, and wherein said vertical decoding means comprise vertical counting means for preventing the provision of a column addressing signal during a time period when a counted number in said vertical counting means corresponds to a vertical space between two adjacent characters in the vertical direction on the screen of said display.

62. The apparatus of claim 61, wherein said horizontal decoding means and said vertical decoding means each comprise a read-only memory responsive to the count values of said horizontal counting means and to said vertical counting means for providing said column and row addressing signals.

63. The apparatus of claim 60, wherein said first storage means comprises a random-access memory (31) and means responsive to said first addressing means for loading said information representing whether or not said character is to be displayed in each of said storing positions of said first storage means.

64. The apparatus of claim 60, wherein said grouped characters comprise a predetermined arrangement pattern, and wherein said second storage means have storing regions corresponding in number at least to the number of said grouped characters for storing in said storing regions information representative of said arrangement pattern.

65. The apparatus of claim 60, wherein said storage means comprise means for storing a plurality of character configurations, said apparatus further comprising character configuration selecting means for selectively reading one of said plurality of character configurations stored in said second storage means.

66. A televison game apparatus for displaying at predetermined positions on a screen of a display of a television receiver by repetitive horizontal and vertical scanning, grouped characters, a moving symbol moving on said screen, and a position controllable symbol, comprising: first storage means having storing positions corresponding in number to the number of said grouped characters to be displayed, each of said storing positions individually storing information indicating whether or not the corresponding character is to be displayed on the screen of said display, first addressing means for sequentially addressing said storing positions of said first storage means in association with said horizontal and vertical scanning of said television receiver, first reading means for reading said information from each of said storing positions of said first storage means as addressed by said first addressing means, moving symbol signal generating means for generating a moving symbol signal for causing a display of a moving symbol on the screen of said display, position controllable symbol signal generating means for generating a position controllable symbol signal for causing a display of a position controllable symbol at a predetermined position on the screen of said display, position controlling means coupled to said position controllable symbol signal generating means for controlling the position of said position controllable symbol displayed on the screen of said display, high frequency signal converting means for composing said information read from said first storage means by means of said first reading means, from said moving symbol signal, and from said position controllable symbol signal for converting the composed signal into a high frequency televison signal representative of said composed signal, wherein said grouped characters comprise an arrangement of characters located in plural rows in the vertical direction and in plural columns in the horizontal direction on the screen of said display, and wherein said first addressing means comprises horizontal direction addressing means for addressing in the horizontal direction and vertical direction addressing means for addressing in the vertical direction, said apparatus further comprising means for generating first reference clock signals, and wherein said horizontal direction addressing means comprises horizontal ring counter means responsive to said first reference clock signals for cyclically counting said first reference clock signals corresponding in number to the length in the horizontal direction of said display, horizontal decoding means responsive to the counted number in said horizontal counting means for providing a column addressing signal for addressing said columns in association with said counted number, wherein said vertical direction addressing means comprises means responsive to said horizontal counting means for providing a second reference clock signal at every predetermined number of said first reference clock signals, vertical ring counter means responsive to said second reference clock signals for cyclically counting said second reference clock signals corresponding in number to the length in the vertical direction of said display, vertical decoding means responsive to the counted number in said vertical counting means for providing a row addressing signal for addressing said rows in association with the counted number in said vertical counting means, wherein said horizontal decoding means comprise means for continuously providing the same column addressing signal during a time period when the counted number in said horizontal counting means corresponds to the width in the horizontal direction of each character on the screen of said display, and wherein said vertical decoding means for continuously providing the same row addressing signal during a time period when the counted number in said vertical counting means corresponds to the width in the vertical direction of each character on the screen of said display.

\* \* \* \* \*

UNITED STATES PATENT AND TRADEMARK OFFICE
CERTIFICATE OF CORRECTION

PATENT NO. : 4,521,020
DATED : June 4, 1985
INVENTOR(S) : Masayuki Uemura, Akitsugu Murauchi, Takehiro Izushi It is certified that error appears in the above—identified patent and that said Letters Patent is hereby corrected as shown below:

Claim 2, (column 25, line 6), replace "row" (second occurrence) by --rows--
        (column 25, line 19), replace "column" by --columns--.

Claim 6, (column 25, line 43), replace "region" by --regions--.

Claim 7, (column 25, line 67), delete "each" (second occurrence).

Claim 13, (column 26, line 54), replace "region" by --regions--.

Claim 14, (column 27, line 10), replace "positions" by --regions--;
       (column 27, line 12), replace "positions" by --regions--;
       (column 27, line 21), replace "positions" by --regions--;
       (column 27, line 24), after "said" insert --storing regions of said--.

Claim 30, (column 30, line 22), after "displayed" insert --as--;
       (column 30, line 26), replace "positions" by --regions--;
       (column 30, line 27), after "composing" insert --an--;
       (column 30, line 30), replace "to display" by --for displaying--.

Claim 60, (column 36, line 47), after "means" insert --,--.

Signed and Sealed this

Eighth Day of October 1985

[SEAL]

Attest:

DONALD J. QUIGG

Attesting Officer

Commissioner of Patents and Trademarks—Designate